(12) United States Patent
Sasaki

(10) Patent No.: US 6,411,290 B1
(45) Date of Patent: Jun. 25, 2002

(54) DEVICE, METHOD AND DISTRIBUTION MEDIUM FOR DRAWING IMAGES TO BE DISPLAYED ON IMAGE DEVICES

(75) Inventor: Nobuo Sasaki, Tokyo (JP)

(73) Assignee: Sony Computer Entertainment, Inc., Tokyo (JP)

( * ) Notice: Subject to any disclaimer, the term of this patent is extended or adjusted under 35 U.S.C. 154(b) by 0 days.

(21) Appl. No.: 09/281,134

(22) Filed: Mar. 29, 1999

(30) Foreign Application Priority Data

Mar. 31, 1998 (JP) .......................................... 10-085375

(51) Int. Cl.$^7$ .............................................. G06T 17/00
(52) U.S. Cl. ...................................................... 345/418
(58) Field of Search ................................. 345/418, 419, 345/420, 422, 423, 424, 427, 429; 382/312

(56) References Cited

U.S. PATENT DOCUMENTS 6,122,412 A * 9/2000 Noguchi et al. ............ 382/312
6,163,337 A * 12/2000 Azuma et al. .............. 382/154
6,222,941 B1 * 4/2001 Zandi et al. ................ 382/232

FOREIGN PATENT DOCUMENTS

| JP | 63-113785 | 5/1988 |
| JP | 4 205485 | 7/1992 |

OTHER PUBLICATIONS

The A–Buffer, An Antialiased Hidden Surface Method Loren Carpenter, Computer Graphics Project Computer Division Lucasfilm Ltd.

* cited by examiner

*Primary Examiner*—Cliff N. Vo
(74) *Attorney, Agent, or Firm*—Rosenman & Colin LLP

(57) ABSTRACT

In an image drawing device and method multiple shift amounts are set for shifting, with precision finer than one pixel, the drawing position when the RGB values of each pixel are to be drawn to a frame buffer, and the image is overwritten by drawing the RGB values into the respective frame buffer locations that correspond to the multiple shift amounts. In this way a point at coordinates is written to a first pixel when drawn for the first time, is written to a second pixel when drawn for the second time, is written to a third pixel when drawn for the third time and is written to the fourth pixel when drawn the fourth time.

85 Claims, 18 Drawing Sheets

DISPLAY PIXEL WHEN SHIFT AMOUNT IS dX=0.0, dY=0.0 (FIRST TIME)

DISPLAY PIXEL WHEN SHIFT AMOUNT IS dX=0.5, dY=0.0 (SECOND TIME)

DISPLAY PIXEL WHEN SHIFT AMOUNT IS dX=0.0, dY=0.5 (THIRD TIME)

DISPLAY PIXEL WHEN SHIFT AMOUNT IS dX=0.5, dY=0.5 (FOURTH TIME)

SHOWS OVERWRITING RESULT WHEN
$1.5 \leq X < 2.0, 2.0 \leq Y < 2.5$ (PIXEL VALUE = 128)

SHOWS OVERWRITING RESULT WHEN
$1.0 \leq X < 1.5, 2.0 \leq Y < 2.5$ (PIXEL VALUE = 225)

SHOWS OVERWRITING RESULT WHEN
$1.5 \leq X < 2.0, 2.5 \leq Y < 3.0$ (PIXEL VALUE = 64)

SHOWS OVERWRITING RESULT WHEN
$1.0 \leq X < 1.5, 2.5 \leq Y < 3.0$ (PIXEL VALUE = 128)

RESULT OF OVERWRITING

SHOWS DISPLAY PIXELS WHEN SHIFT AMOUNT IS dX = 0.0, dY = 0.0

SHOWS DISPLAY PIXELS WHEN SHIFT AMOUNT IS dX = 0.5, dY = 0.0

SHOWS DISPLAY PIXELS WHEN SHIFT AMOUNT IS dX = 0.0, dY = 0.5

SHOWS DISPLAY PIXELS WHEN SHIFT AMOUNT IS dX = 0.5, dY = 0.5

ANTI-ALIAS STRAIGHT LINE
GENERATED BY OVERWRITING
FOUR TIMES

RESULT OF START-END OF
STRAIGHT LINE

● RESULT OF
SUB-PIXEL DATA

DISPLAY PIXELS WHICH
INCLUDE EFFECTIVE
SUB-PIXELS ARE DRAWN

STRAIGHT LINE DRAWING
WITH SUB-PIXEL DIVISION

DEVICE, METHOD AND DISTRIBUTION MEDIUM FOR DRAWING IMAGES TO BE DISPLAYED ON IMAGE DEVICES

BACKGROUND OF THE INVENTION

1. Field of the Invention

The present invention relates to a drawing device and drawing method, as well as a distribution medium, and more specifically, it concerns a drawing device and drawing method, and a distribution medium, that will make it possible to display images of high picture quality on, for example, three-dimensional graphic computers, which are image devices that employ a computer, or on special effects devices (effectors), video game machines, or the like.

2. Description of the Prior Art

The higher degree of integration and higher speeds achieved in processors and memories have made possible what was previously difficult, namely the generation of three-dimensional images in real time, making it possible to display three-dimensional images with a sense of presence on video game machines, for example. If a three-dimensional image is to be displayed, in many cases the three-dimensional image is broken up into multiple polygons (unit graphic forms), and the three-dimensional image as a whole is drawn by drawing each of these polygons. Thus it can be said that a three-dimensional image that is drawn in this way is defined as a combination of polygons.

For example, the display of a three-dimensional image is accomplished by performing coordinate transformations on the data of the polygons that comprise it, performing geometrical processing such as clipping and lighting, and performing perspective and projective transformations on the data obtained from such processing, thus taking data in three-dimensional space and turning it into pixel data in a two-dimensional plane, then drawing it. But in such drawing, the position of a polygon, which until then was expressed by floating point or fixed point, is converted to integers corresponding to the pixels in fixed positions on the screen. This results in aliasing and "jaggy" staircase-like edges, creating the problem that the picture quality is inferior to that of an image taken with a video camera.

In addition, there is a further problem that aliasing appears as flickering of the image, which disconcerts the viewer.

Here, aliasing is not limited to images; when a signal is sampled at a finite number of points, it is the sampling error that occurs due to the fact that the number of sampling points is too small.

One method for reducing the degradation of picture quality caused by aliasing is to virtually divide each pixel into smaller units called subpixels, and after ray tracing or some other calculation is done in these subpixel units, the results of the calculation are averaged to the nearest pixel unit, but ray tracing computation takes considerable time, and despite the speedup in processors, memory, and other hardware, at the present time it is impossible to do such ray tracing computation in real time for moving images. That is, a moving image generally consists of about 20–30 frames per second, but at present it is impossible with reasonably priced hardware to perform ray tracing computations 20–30 times a second in subpixel units.

Another method is to perform antialiasing (reducing the degradation in picture quality that is caused by aliasing) by generating a high-resolution image and filtering it to reduce the number of pixels, but displaying moving images by this method requires a fast, high-capacity frame buffer or Z buffer to store the high-resolution images, which makes the equipment big and expensive.

Another method to carry out antialiasing is a technique known as α blending, in which, if for example a certain graphic form is to be displayed, the proportion of the pixel that the graphic form occupies is determined, and it graphic form and background are α-blended based on this proportion. This method is used for the edges of graphic forms, but it is not effective for the flickering of textures put onto graphic forms or for the aliasing that occurs where three-dimensional shapes cross each other (intersection lines) (for example, if one sphere sinks into another, the part where the two spheres intersect each other).

SUMMARY OF THE INVENTION

It is an object of the present invention to reduce the degradation in picture quality caused by aliasing, while avoiding as much as possible any increase in the cost or size of the equipment.

This and other objects of the present invention are obtained by a drawing device comprising a shift amount setting means for setting multiple shift amounts for shifting, with a precision finer than one pixel, a drawing position when pixel data is to be drawn in a pixel data memory means, and, a drawing means in the pixel data memory means, for overwriting the image by drawing the pixel data in each position corresponding to the multiple shift amounts set by the shift amount setting means.

According to the present invention, a drawing method is proposed, which comprises a shift amount setting step of setting multiple shift amounts for shifting, with a precision finer than one pixel, the drawing position when the pixel data is to be drawn in the pixel data memory means of the drawing device, and a drawing step of overwriting the image by drawing the pixel data to each position of the pixel data memory means corresponding to the multiple shift amounts.

According to the present invention a distribution medium is proposed that provides a computer program that has a shift amount setting step that sets multiple shift amounts for shifting, with a precision finer than one pixel, the drawing position when the pixel data is to be drawn to memory, and a drawing step that overwrites the image by drawing the pixel data to each position of the memory corresponding to the multiple shift amounts.

In the drawing device of the present invention, the shift amount setting means sets multiple shift amounts for shifting, with a precision finer than one pixel, the drawing position when the pixel data is to be drawn in the pixel data memory means, and the drawing means, in the pixel data memory means, overwrites the image by drawing the pixel data in each position corresponding to the multiple shift amounts set by the shift amount setting means.

In the drawing method of the present invention, multiple shift amounts are set for shifting, with a precision finer than one pixel, the drawing position when the pixel data is to be drawn in the pixel data memory means, and the image is overwritten by drawing the pixel data to each position of the pixel data memory means corresponding to the multiple shift amounts.

In the distribution medium of the present invention, a computer program is provided for causing the computer to set multiple shift amounts for shifting, with a precision finer than one pixel, the drawing position when the pixel data is to be drawn to memory, and to carry out the processing to overwrite the image by drawing the pixel data to each position of the memory corresponding to the multiple shift amounts.

In the embodiment, the drawing device of the present invention includes a pixel data memory means that stores pixel data to be output to a two-dimensional output device that outputs the image (for example a frame buffer), a shift amount setting means that sets multiple shift amounts for shifting, with a precision finer than one pixel, the drawing position when the pixel data is to be drawn in the pixel data memory means, and a drawing means in the pixel data memory means that overwrites the image by drawing the pixel data in each position corresponding to the multiple shift amounts set by the shift amount setting means.

In a further embodiment, the drawing device further includes a count determination means that determines the number of overwriting times the drawing means shall overwrite the image.

The drawing means of the drawing device of this invention may further include an estimation means that estimates the drawing time needed for drawing one screenful of the pixel data to the pixel data memory means, and the count determination means determines the number of overwriting times based on the drawing time estimated by the estimation means.

According to yet another embodiment, the drawing device, if the image is a moving image, further comprises a correction means that corrects the shift amounts based on the movement of the moving image.

In the drawing device of the present invention if the image is a three-dimensional image defined by a combination of unit graphic forms, a sorting means is provided that sorts the unit graphic forms into the order of their depth direction, and the drawing means draws the unit graphic forms in order, beginning with those near the viewpoint.

The drawing device may further comprise an operation means that is operated when a prescribed input is given, an arithmetic operation means that reads in data recorded in a storage medium and performs the prescribed arithmetic operations using this data, based on input from the operation means, such as main CPU, and a pixel data generation means for example GPU, that determines the pixel data based on the results of the arithmetic operation by the arithmetic operation means.

In the drawing device of the present invention, if the image is a three-dimensional image defined by a combination of unit graphic forms, a conversion means is provided that, in accordance with the viewpoint, converts the unit graphic forms that constitute the three-dimensional image to ones in the coordinate system of the two-dimensional output device, for example, CPU, a sorting means that sorts the unit graphic forms converted by the conversion means into the order of their depth direction and a depth memory means (for example Z buffer) that records the values that represent the position of the unit graphic forms in the depth direction, and using the depth memory means, the drawing means draws the unit graphic forms in order, beginning with those near the viewpoint.

In the drawing device of the present invention, if the image is a three-dimensional image defined by a combination of unit graphic forms, it further, comprises an operation means that is operated when a prescribed input is given, an arithmetic operation means that reads in data recorded in a storage medium and performs the prescribed arithmetic operations using this data, based on input from the operation means, for example, main CPU, a conversion means that converts the unit graphic forms obtained as a result of calculation by the arithmetic operation means to ones in the coordinate system of the two-dimensional output device, a sorting means that sorts the unit graphic forms converted by the conversion means into the order of their depth direction, and a depth memory means that records the values that represent the position of the unit graphic forms in the depth direction (for example Z buffer), and using the depth memory means, the drawing means draws the unit graphic forms in order, beginning with those near the viewpoint.

DETAILED DESCRIPTION OF THE PREFERRED EMBODIMENTS

Figure 1:
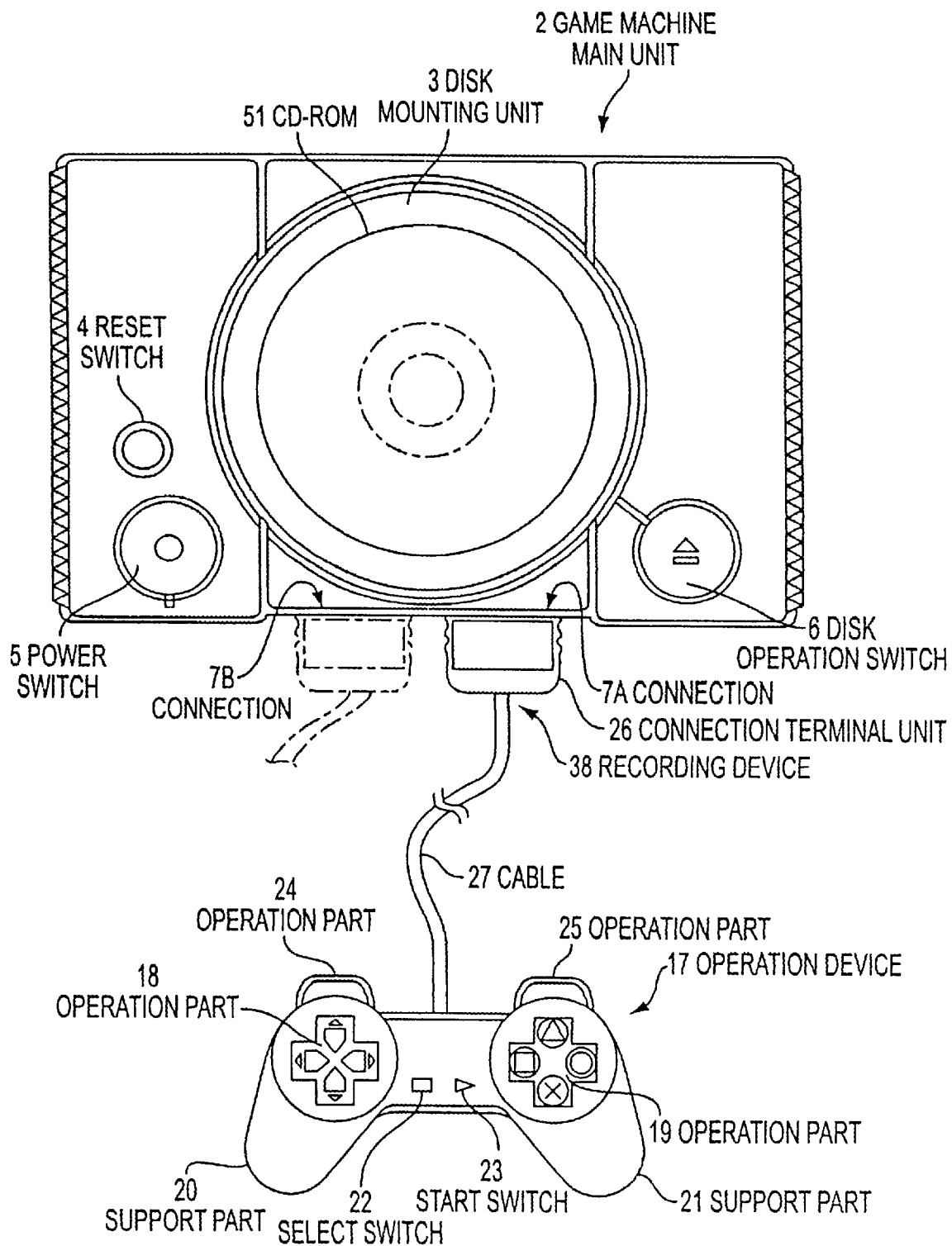
FIG. 1 is a top view showing an example of an embodiment of a video game machine to which the drawing device and method of the present invention are applied.
Figure 2:
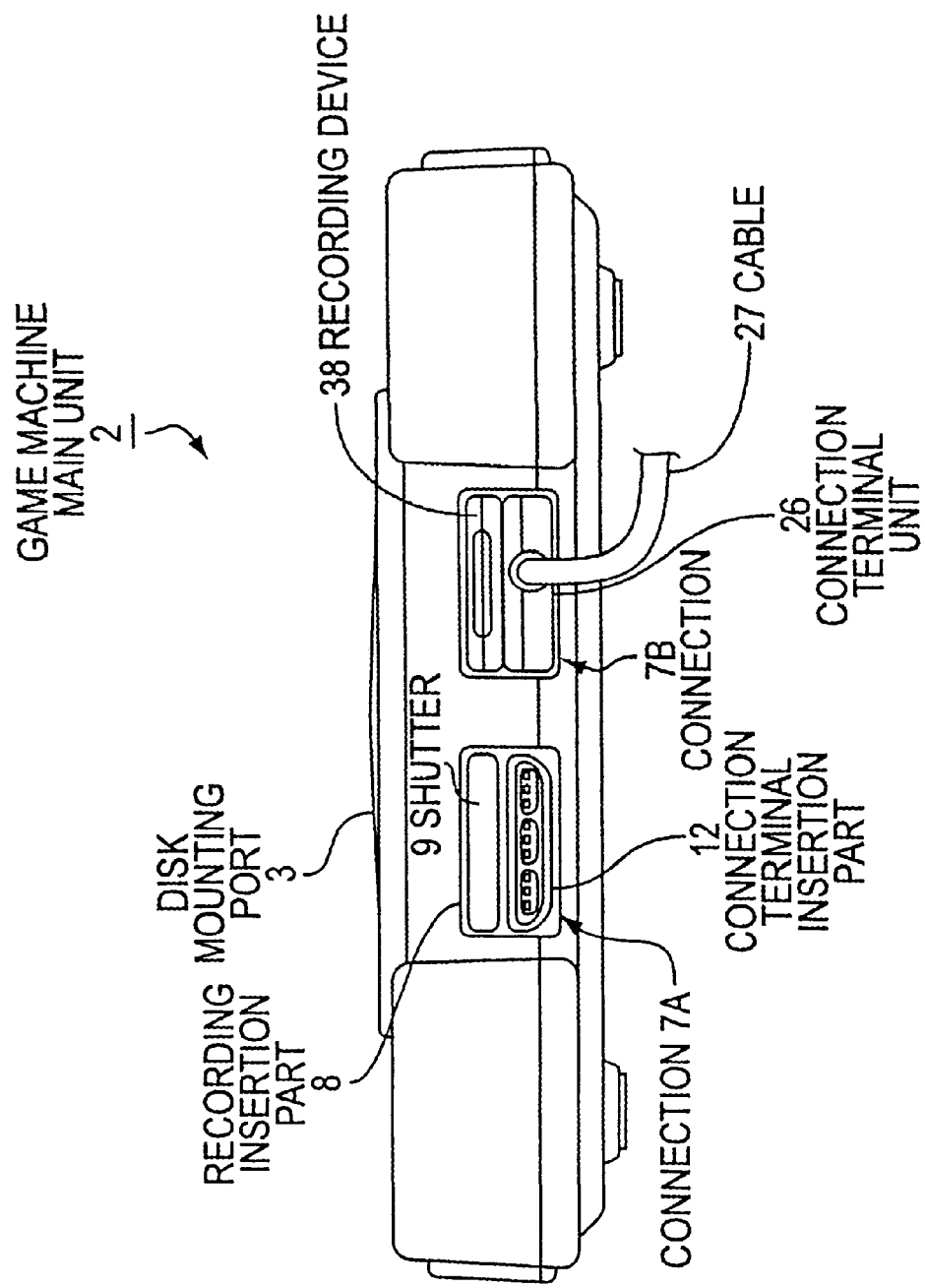
FIG. 2 is a front view of the video game machine of FIG. 1.
Figure 3:
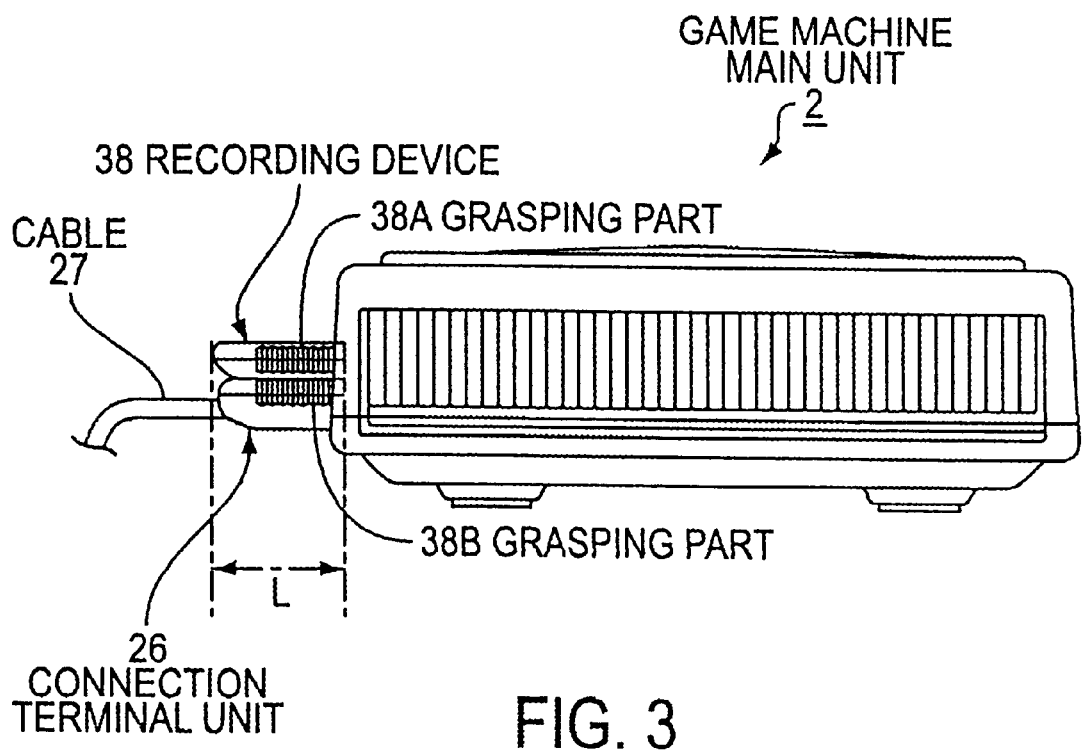
FIG. 3 is a side view of the video game machine of FIG. 1.

Referring now to the drawings in detail, FIG. 1 is a top view showing an embodiment of a video game machine to which this invention applies. FIG. 2 is a front view of it (the view seen from below in FIG. 1), and FIG. 3 is a side view of it from the right (the side view seen facing it from the right in FIG. 1).

The video game machine comprises a game machine main unit 2, an operation device (operation means) 17, which has a roughly rectangular connection terminal unit 26 that is connected with the game machine main unit 2, and a recording device 38, which is likewise connected with the game machine main unit 2.

Figure 4:
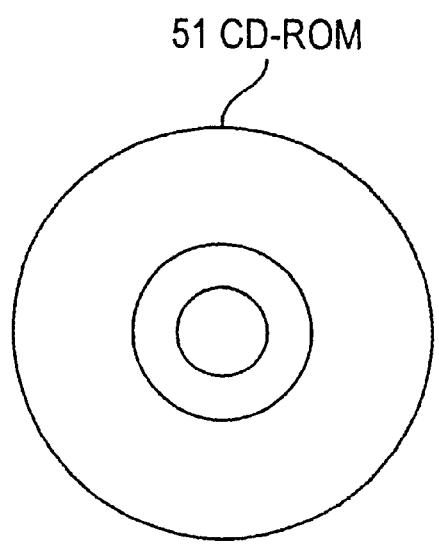
FIG. 4 is a top view showing CD-ROM 51.

Game machine main unit 2 may be formed in roughly rectangular shape and has positioned in its center a disk mounting unit 3 on which one mounts a game recording medium on which are recorded computer programs (including programs for rendering (drawing) processing, which will be described later) and data for playing games. In this embodiment, for example, CD-ROM (Compact Disk-Read Only Memory) 51 as shown in FIG. 4 can be mounted onto and removed from the disk mounting unit 3. However, the game recording media are not limited to a disk.

On the left side of the disk mounting unit 3 are a reset switch 4, which is operated when the game is to be reset, and a power switch 5, which is operated when the power is to be turned on or off, and on its right side is a disk operation switch 6, which is operated when the disk mounting unit 3 is to be opened or closed. On the front of the game machine main unit 2 are connections 7(A) and 7(B), by which the operation device 17 and recording device 38 can be connected as a set. In this embodiment, connections 7(A) and 7(B) are provided to allow two sets of the operation device 17 and recording device 38 to be connected. However, it is possible to have as many connections as are needed to connect two or more sets of operation device 17 and recording device 38. Also, a large number of operation devices and recording devices can be connected by attaching to connection 7(A) or 7(B) an adaptor that allows one to expand the number of connections for the operation device 17 and recording device 38.

As shown in FIGS. 2 and 3, connections 7(A) and 7(B) have a two-stage structure, having on the upper stage a recording insertion part 8 that is connected with recording device 38, and having on the lower stage a connection terminal insertion part 12 that connects with connection terminal part 26 of operation device 17.

The insertion hole of recording insertion part 8 has a horizontally oblong shape, and the corners on both ends of its lower side are rounder than the corners on both ends of its upper side, thus forming a structure that makes it impossible to insert the recording device 38 upside-down. Recording insertion part 8 also has a shutter 9 that protects the internal connection terminal (not shown) by which the electrical connection is made.

Shutter 9 is attached so as to be urged outward at all times by an elastic body (not shown) such as a spring formed in a coil-twisted spring shape. Therefore shutter 9 is opened inward, when the recording device 38 is inserted, by the front end side by which recording device 38 is inserted, and when the recording device 38 is pulled out, it is returned by the urging force of the elastic body to its original position and it is automatically closed, protecting the internal connection terminal from dust and from external impact.

As shown in FIGS. 2 and 3, connection terminal insertion part 12 has a horizontally oblong-shaped insertion hole in which the corners at both ends of its lower side are rounder than the corners on both ends of its upper side, thus forming a structure that makes it impossible to insert the connection terminal part 26 of the operation device 17 upside-down, as well as having a structure whose insertion hole has a different shape so that recording device 38 cannot be inserted upside-down. Thus the recording device 38 and operation device 17 have insertion holes that differ in size and shape so that they cannot be mistaken for each other.

As shown in FIG. 1, operation device 17 has a structure by which it is held between the palms of both hands and can be manipulated with the five fingers being free to move; it comprises first and second operation parts 18 and 19, which are arranged symmetrically left and right and have a rounded shape, first and second support parts 20 and 21, which are shaped to protrude at an angle from the first and second operation parts 18 and 19, a select switch 22 and a start switch 23, which are provided on the narrow part located between first and second operation parts 18 and 19, third and fourth operation parts 24 and 25, which are shaped to protrude on the front side of first and second operation parts 18 and 19, and connection terminal part 26 and cable 27 for making an electrical connection with game machine main unit 2.

Operation device 17 may also be constituted so as to be electrically connected with game machine main unit 2 without any intervening connection terminal part 26 and cable 27, by, for example, infrared.

A motor, for example, may be built into operation device 17 in order to cause it to vibrate. By causing operation device 17 to vibrate in coordination with game scenes, the user can be given a sense of presence and involvement. As motors to be built into operation device 17, multiple motors of different rotation speed can be adopted. If this is done, the user can be given small vibrations, large vibrations, and vibrations in which they are combined, fitting the scenes of the game.

Connection terminal part 26 is attached to the end of cable 27 for making an electrical connection with game machine main unit 2, and as shown in FIG. 3, it has on both its left and right sides a grasping part that has been given no-slip processing (for example, knurling) in a corrugated pattern shaped with ridges and valleys. Also, the grasping part on connection terminal part 26 forms a so-called retractable part, and its size, that is, its width W and length L, are made the same as those of the grasping part of recording device 38, which is described below.

Recording device 38 has a built-in non-volatile memory, for example a flash memory, and on both sides it has a grasping part (FIG. 3) constructed in the same way as in the case of connection terminal part 26, making it easy to attach it to and remove it from game machine main unit 2. Moreover, recording device 38 is made so that if, for example, the game is interrupted temporarily, its state at that time is stored (recorded), making it possible, by reading the data from it upon restart, to resume the game from the state corresponding to that data, that is, from the state at the time of the interruption.

If a game is to be played with a video game machine constituted as described above, the user for example connects operation device 17 to game machine main unit 2 and, as necessary, also connects recording device 38 to game machine main unit 2. And by operating disk operation switch 6, the user puts CD-ROM 51 as a game recording medium onto disk mounting unit 3, and turns on the power to game machine main unit 2 by operating power switch 5. In this way, the images and sounds for the game are played back on game machine main unit 2, so the user plays the game by operating operation device 17.

Figure 5:
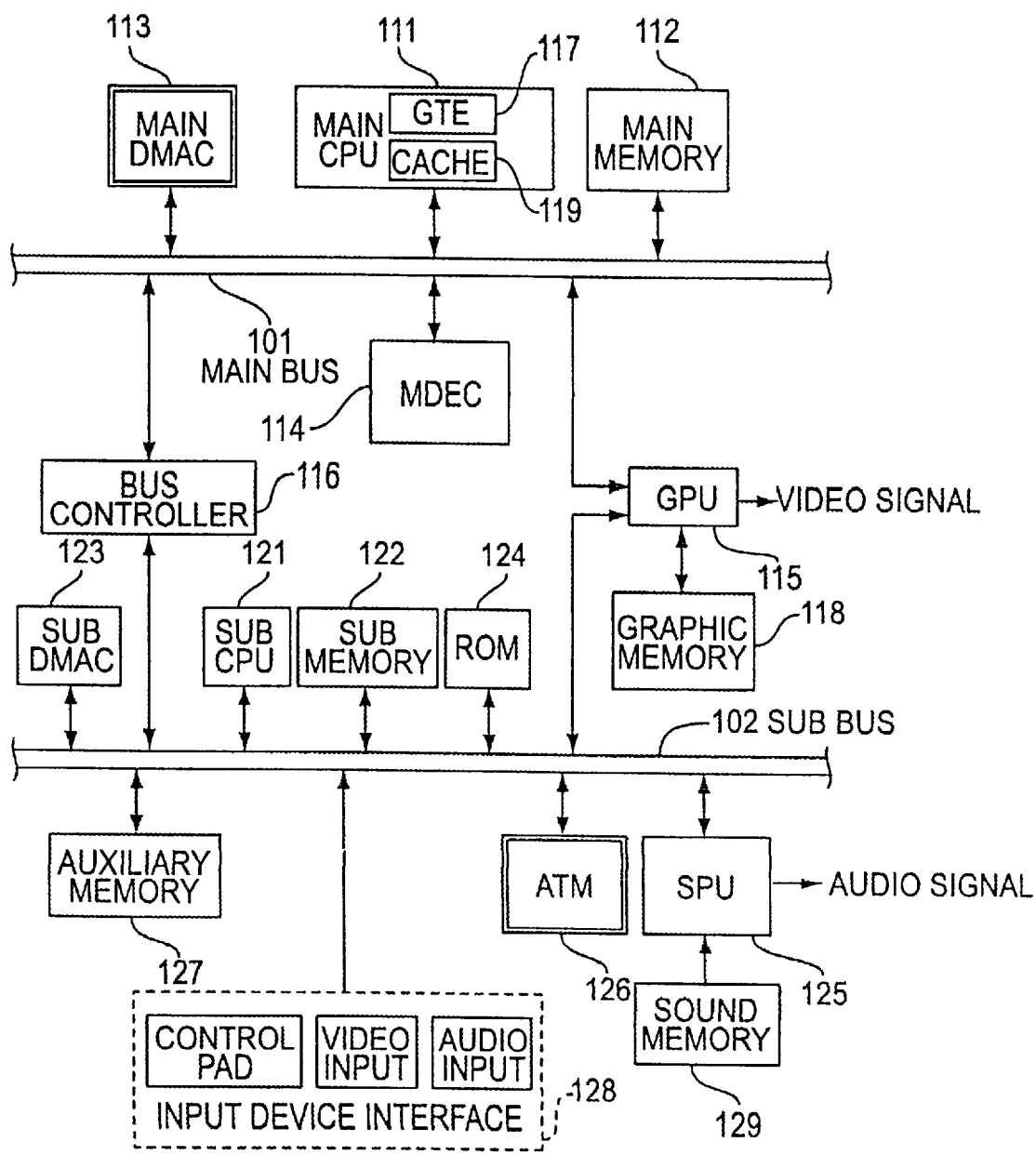
FIG. 5 is a block diagram showing an example of the electrical composition of game machine main unit of FIG. 1.

Next, FIG. 5 shows an example of the electrical composition of game machine main unit 2 of FIG. 1.

This game machine main unit 2 has two types of buses for exchanging data in the various blocks, a main bus 101 and a sub bus 102; the main bus 101 and sub bus 102 are connected via a bus controller 116.

Connected to main bus 101 are, besides bus controller 116, a main CPU (Central Processing Unit) 111, which for example consists of a microprocessor, etc., a main memory 112, which for example consists of RAM (Random Access Memory), a main DMAC (Direct Memory Access Controller) 113, a MDEC (MPEG (Moving Picture Experts Group) Decoder) 114, and a GPU (Graphic Processor Unit) 115.

Connected to sub bus 102 are, besides bus controller 116, GPU 115, sub CPU 121, which for example is configured in the same way as CPU 111, a sub memory 122, which for example is configured in the same way as main memory 112, a sub DMAC 123, a ROM (Read Only Memory) 124, which for example holds the operating system, a SPU (Sound Processing Unit) 125, an ATM (Asynchronous Transmission Mode) communication unit 126, an auxiliary memory device 127, and an input device interface I/F 128.

Here, data is exchanged at high speed by main bus 101 and at low speed by sub bus 102. That is, the high-speed performance of main bus 101 is assured by using sub bus 102 for data that can be exchanged at low speed.

Bus controller 116 is made so as to disconnect main bus 101 and sub bus 102 and connect main bus 101 and sub bus 102. If main bus 101 and sub bus 102 are disconnected, only devices connected to main bus 101 can be accessed from main bus 101, and only devices connected to sub bus 102 can be accessed from sub bus 102, but if sub bus 102 is connected to main bus 101, any device can be accessed from either main bus 101 or sub bus 102. And in the initial state, such as immediately after the power to the device has been turned on, bus controller 116 is in open state (the state in which main bus 101 and sub bus 102 are connected).

Main CPU 111 performs various processing in accordance with programs stored in main memory 112. That is, main CPU 111, for example when the device is activated, reads via bus controller 116 the booting program from ROM 124 (connected to sub bus 102), which is on sub bus 102, and executes it. In this way, main CPU 111 causes the application programs (here, the game programs and the below-described programs for performing drawing processing) and necessary data to be loaded from auxiliary memory device 127 into main memory 112 and sub memory 122. Then main CPU 111 executes the programs it has thus caused to be loaded into main memory 112.

Main CPU 111 has a built-in GTE (Geometry Transfer Engine) 117; the GTE 117 has for example a parallel operation mechanism that executes multiple operations in parallel, and in accordance with requests from main CPU 111 it performs high-speed arithmetic processing for such geometry processing as coordinate system transformations, light source computation, matrix operations, and vector operations. Thus, by carrying out processing (geometry processing) in accordance with requests from main CPU 111, GTE 117 generates and supplies to main CPU 111 the data (hereafter called "polygon data" for short) for the polygons (in this Specification, this includes, besides polygons having three or more vertices, straight lines (line segments) and points) that constitute the three-dimensional image to be displayed. When main CPU 111 receives the polygon data from GTE 117, it converts it into two-dimensional plane data by perspective and projective transformations and transfers it to GPU 115 via main bus 101.

Main CPU 111 also has a built-in cache memory 119; processing can be speeded up by accessing the cache memory 119 instead of accessing main memory 112.

As described above, the main memory 112, besides storing programs, etc., also stores data necessary for processing by main CPU 111. Main DMAC 113 controls DMA transfers to devices on main bus 101. But when bus controller 116 is in open state, main DMAC 113 also controls devices on sub bus 102. MDEC 114, which is an I/O device that can operate in parallel with main CPU 111, functions as an image expansion engine. That is, MDEC 114 decodes image data that was compressed by MPEG encoding.

GPU 115 functions as a rendering processor. That is, GPU 115 receives the polygon data transmitted from main CPU 111, computes the pixel data that constitutes the polygon based on, for example, color data for the vertices of the polygon and Z values that indicate their depth (depth from the viewpoint), and performs rendering processing that writes it into (draws it to) graphic memory 118. Also, GPU 115 reads out the pixel data that has been written into graphic memory 118 and outputs it as a video signal. In addition, GPU 115, as necessary, receives polygon data also from main DMAC 113 or devices on sub bus 102 and performs rendering processing in accordance with this polygon data.

Figure 6:
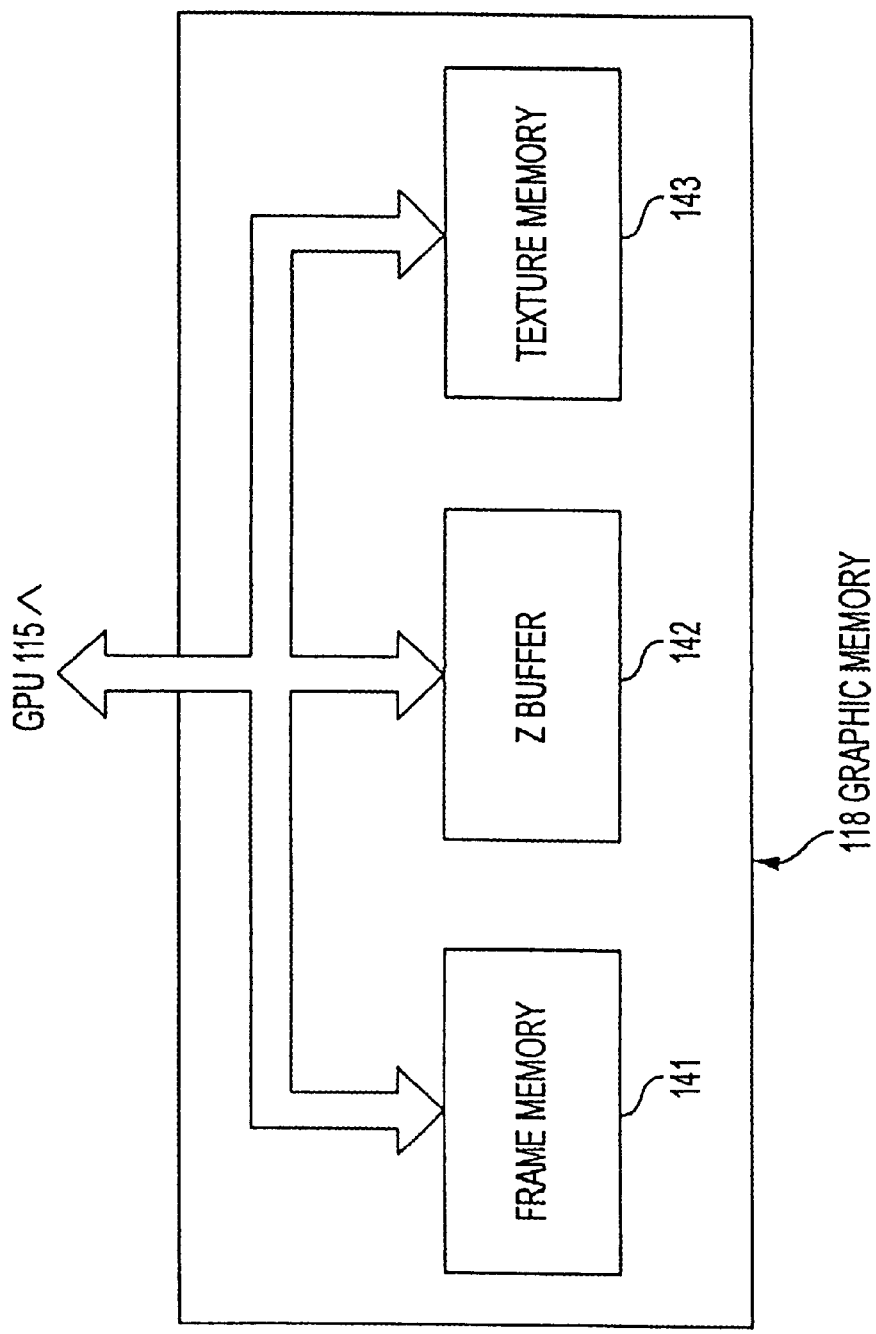
FIG. 6 is a block diagram showing the detailed composition of graphic memory of the unit of FIG. 5.

As shown in FIG. 6, graphic memory 118 consists of, for example, DRAM, and has a frame memory 141, a Z buffer 142, and a texture memory 143. Frame memory 141 stores, for example one frame at a time, the pixel data to be displayed on the screen. Z buffer 142 stores the Z value of the polygon that is nearest to the viewer in the image to be displayed on screen; for example it has enough memory capacity to store the Z values for one frame. Texture memory 143 stores data on the texture to be attached to the polygons.

GPU 115 performs rendering processing using frame memory 141, Z buffer 142, and texture memory 143. That is, GPU 115 causes the Z value of the polygon constituting the three-dimensional image that is nearest to the viewer to be stored, and based on the values stored in this Z buffer 142, it is decided whether to draw the pixel data to frame buffer 141. If the pixel data is to be drawn, texture data is read from texture memory 143, and this data is used to determine the pixel data to be drawn, and drawing is done to frame memory 141.

Also, GPU 115 performs a Z sort, which sorts the polygons in the order of their depth, and here rendering is done in order, beginning with the polygon nearest to the viewer.

Returning to FIG. 5, the sub CPU 121 performs various processing by reading and executing programs stored in sub memory 122. Stored in sub memory 122, as in main memory 112, are programs and the required data. Sub DMAC 123 controls DMA transfers to devices on sub bus 102. Also, sub DMAC 123 acquires bus rights only when bus controller 116 is in closed state (when main bus 101 and sub bus 102 are disconnected). ROM 124, as described above, stores the booting program and the operating system, etc. Also stored in ROM 124 are programs for both main CPU 111 and sub CPU 121. ROM 124 here has a slow access speed, and therefore it is on sub bus 102.

SPU 125 receives packets transmitted from sub CPU 121 or sub DMAC 123 and reads audio data from sound memory 129 according to the sound commands laid out in these packets. Then SPU 125 outputs the read-out audio data to a speaker not shown. ATM communication unit 126 performs control (ATM communication control) of the communication that is done via, for example, public lines not shown. In this way a video game machine user can compete with other video game machine users by exchanging data either directly or via the Internet or a so-called personal computer communications center.

Auxiliary memory device 127 plays back information (programs, data) stored on CD-ROM 51 (FIG. 1, FIG. 4) by, for example, a disk drive. Auxiliary memory device 127 also records information to and reads information from recording device 38 (FIG. 1). Input device interface 128 is an interface for receiving signals corresponding to operation of operation device 17 (FIG. 1) as a control pad or external inputs such as images and audio generated by other devices, and it outputs to sub bus 102 signals that respond to input from outside. Sound memory 129 stores audio data.

In game machine main unit 2, which is constituted as described above, when the power to the device is turned on, the booting program is read from ROM 124 and is executed in main CPU 111, and thereby programs and data are read from CD-ROM 51 (FIG. 4), which is mounted on auxiliary memory device 127, and are expanded to main memory 112 and sub memory 122. In the main CPU 111 or sub CPU 121, respectively, the program expanded into main memory 112 or sub memory 122 is executed, thereby playing back the game images (here assumed to be moving images) and sound.

That is, for example, in main CPU 111 the polygon data for drawing the polygons that constitute a prescribed three-dimensional image is generated according to the data stored in main memory 112. This polygon data, for example, is packetized and supplied to GPU 115 via main bus 101.

When a packet is received from main CPU 111, GPU 115 performs a Z sort and uses Z buffer 142 to draw to the frame memory 141 in order, beginning with the polygon nearest to the viewer. The results of drawing to the frame memory 141 are appropriately read in GPU 115 and output as a video signal. In this way, three-dimensional images for the game are displayed on a two-dimensional screen, for example on a display not shown, as a two-dimensional output device.

Meanwhile, in the sub CPU 121, sound commands that direct the generation of audio are generated in accordance with the data stored in sub memory 122. These sound commands are packetized and supplied to SPU 125 via sub bus 102. SPU 125 reads audio data from sound memory 129 and outputs it in accordance with the sound commands from sub CPU 121. In this way, background music for the game and other sounds are output.

Next, the polygon rendering (drawing) processing performed in game machine main unit 2 of FIG. 5 will be described in detail.

As described above, polygon pixel data is drawn to the frame buffer 141 by GPU 115 of the game machine main unit 2. However, but when this is done, multiple shift amounts are set for shifting the drawing position of the pixel data by a precision finer than one pixel, such as for example subpixel precision, and pixel data is drawn to each position (memory cell) of frame buffer 141 corresponding to these multiple shift amounts, and in this way polygons, as well as the three-dimensional image constituted by the polygons, are overwritten.

That is, assuming now for example that a point is to be drawn whose coordinates in three-dimensional space are given by (x,y,z), in main CPU 111 this point (x,y,z) is geometrically processed based on viewpoint and other information and is perspective-transformed to a point (X,Y,Z) in the screen coordinate system (the coordinate system corresponding to the screen of the display on which the three-dimensional image is to be displayed), which is a two-dimensional plane. Here x, y, z, X, Y, Z are values expressed by a floating point or fixed point. Also, the Z of point (X,Y,Z) in the plane coordinate system represents the position of the point in the depth direction from the viewpoint.

Also, GPU 115 determines the R, G, B signals (Ri,Gi,Bi) as color information for the point at point (X,Y,Z), and other information, from the viewpoint, the light source, the texture, etc. The i in Ri, Gi, Bi indicates that it is an integer value, and in this embodiment, Ri, Gi, Bi are each expressed by, for example, 8 bits and therefore assume a value in the range from 0 to 255.

And assuming now for example that the number of overwriting times is set to 4 times and that each pixel is divided into 4 equal parts horizontally and vertically so as to yield 16 (=4×4) subpixels for each pixel, as shown in FIGS. 7(A)–7(D), GPU 115 sets each of the shift amounts (dX,dY) for the drawing position in the screen coordinate system when point (X,Y,Z) is drawn the first through fourth times to, for example, (0.0,0.0), (0.5,0.0), (0.5,0.5), (0.0,0.5), which is the precision of twice a subpixel (here, ½ of a pixel). In FIGS. 7(A)–7(D) (as in later FIGS. 8–17), the (positive direction of the) X axis or Y axis is taken to be rightward or upward, respectively.

Thereafter, CPU 115 draws the point by shifting the drawing position according to the shift amounts (dX,dY).

That is, in drawing for the first time, GPU 115 shifts point (X,Y,Z) by (0.0,0.0) and converts the shifted point (X,Y,Z) to point (Xs,Ys,Zs) of subpixel precision (hereafter, for convenience, this is called subpixel precisioning). The s in Xs, Ys, Zs indicates that it is a value in subpixel precision; in FIGS. 7(A)–7(D) because one pixel is divided horizontally and vertically into four equal parts, subpixel precision is 0.25 (=¼). That is, in FIG. 7, the subpixel coordinates at the far lower left are set to (0.0,0.0), and as one moves rightward or upward the subpixel coordinates increase 0.25 at a time.

Then, color information (Ri,Gi,Bi) corresponding to point (Xs,Ys,Zs) is written into the position of the pixel that includes the subpixel that corresponds to point (Xs,Ys,Zs). For the color information (pixel information), the value obtained by dividing by the overwriting number of times is written in. Specifically, because the overwriting number of times here is 4 times, (Ri/4,Gi/4,Bi/4) is written in as color information.

Figure 7B:
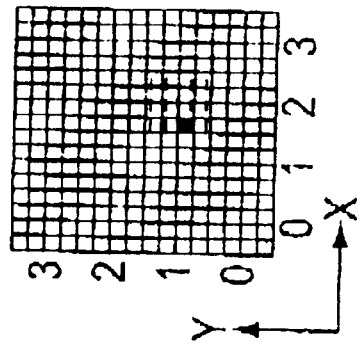
FIGS. 7(A)–7(D) show diagrams for explaining the overwriting of a point.
Figure 7D:
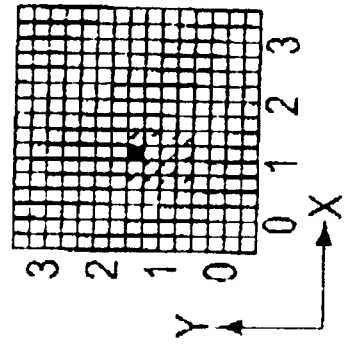
Figure 7A:
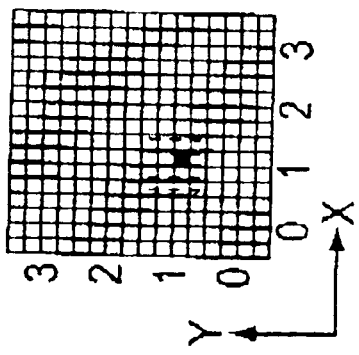

Here, assuming now for example that the X or Y coordinate of point (X,Y,Z) to be drawn was 1.6 or 1.3, respectively, in drawing the first time, point (1.6,1.3,Z) is shifted by (0.0,0.0), and, as shown in FIG. 7(A), ¼ of the color information that properly speaking is to be written in (the portion indicated by vertical dotted lines in FIG. 7(A)) is written into the position (1,1) of the pixel that includes the subpixel that corresponds to the point (1.5,1.25,Zs) that is obtained by subpixel-precisioning this shifted point (1.6,1.3, Z) (indicated by the dark circle in FIG. 7(A)).

In drawing the second time, GPU 115 shifts point (X,Y,Z) by (0.5,0.0) and subpixel-precisions this shifted point to point (Xs,Ys,Zs). Then ¼ of the color information (Ri,Gi,Bi) is overwritten to the position of the pixel that contains the subpixel that corresponds to point (Xs,Ys,Zs).

That is, assuming now, as stated above, for example that the X or Y coordinate of point (X,Y,Z) to be drawn was 1.6 or 1.3, respectively, in drawing the second time, point (1.6,1.3,Z) is shifted by (0.5,0.0), and, as shown in FIG.

7(B), ¼ of the color information that properly speaking is to be written in (the portion indicated by horizontal dotted lines in FIG. 7(B)) is written into the position of the pixel (2,1) that includes the subpixel that corresponds to the point (2.0,1.25,Zs) that is obtained by subpixel-precisioning this shifted point (2.1,1.3,Z) (indicated by the dark circle in FIG. 7(B)). Specifically, in pixel (2,1), ¼ of the color information that properly speaking is to be written in is added to the color information that has already been written in, and the value of the sum is written into pixel (2,1).

Figure 7C:
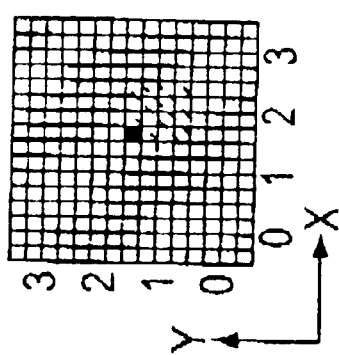

The same is done in drawing the third and fourth times as well. That is, assuming now for example that the X or Y coordinate of point (X,Y,Z) to be drawn was 1.6 or 1.3, respectively, in drawing the third time, point (1.6,1.3,Z) is shifted by (0.5,0.5), and, as shown in FIG. 7(C), ¼ of the color information that properly speaking is to be written in (the portion indicated by slash-slanted dotted lines in FIG. 7(C)) is written into the position of the pixel (2,1) that includes the subpixel that corresponds to the point (2.0,1.75, Zs) that is obtained by subpixel-precisioning this shifted point (2.1,1.8,Z) (indicated by the dark circle in FIG. 7(C)). Specifically, in pixel (2,1), ¼ of the color information that properly speaking is to be written in is added to the color information that has already been written in, and the value of the sum is written into pixel (2,1).

And in drawing the fourth time, point (1.6,1.3,Z) is shifted by (0.0,0.5), and, as shown in FIG. 7(D), ¼ of the color information that properly speaking is to be written in (the portion indicated by backslash-slanted dotted lines in FIG. 7(D)) is written into the position of the pixel (1,1) that includes the subpixel that corresponds to the point (1.5,1.75, Zs) that is obtained by subpixel-precisioning this shifted point (1.6,1.8,Z) (indicated by the dark circle in FIG. 7(D)). Specifically, in pixel (1,1), ¼ of the color information that properly speaking is to be written in is added to the color information that has already been written in, and the value of the sum is written into pixel (1,1).

Figure 8:
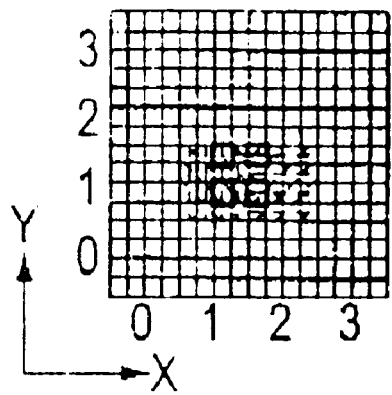
FIG. 8 shows a diagram of the result of overwriting of a point.

The result of drawing point (1.6,1.3,Z) as described above (the result of overwriting) is as shown in FIG. 8.

By overwriting as described above, the resolution can be increased essentially 4-fold, and as a result, antialiasing can be done.

If overwriting is to be done, when the shift amount (dX,dY) for each of the four times that drawing is to be done is set to (0.0,0.0), (0.5,0.0), (0.5,0.5), (0.0,0.5) as described above, the position of the drawn point is sometimes shifted to the upper right of its proper position, so to prevent such a shift, the shift amounts (dX,dY) may be set to, for example, (−0.25,−0.25), (0.25,−0.25), (0.25,0.25), (−0.25, 0.25) (so that the average value of shift amount dX or dY is 0 for each).

Figure 9:
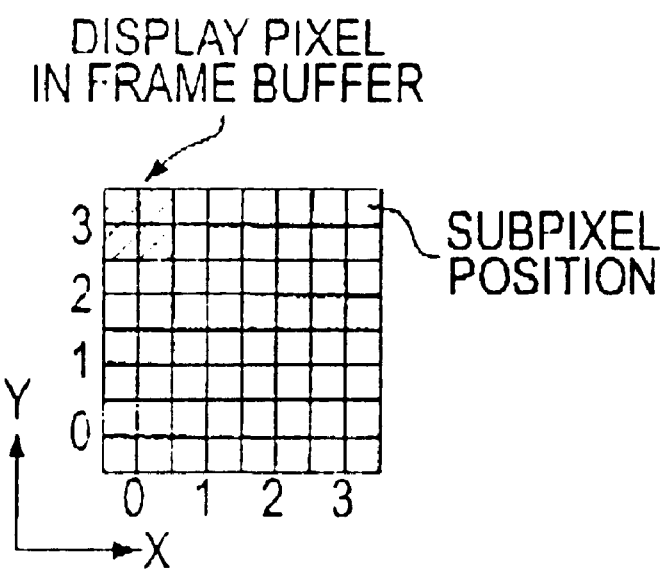
FIG. 9 is a diagram showing a pixel composed of 2×2 subpixels.

Next, although 16 subpixels were assumed for each pixel in FIGS. 7(A)–7(D) and FIG. 8, the same sort of overwriting can be done if, for example, each pixel is divided into two equal parts horizontally and vertically as shown in FIG. 9, thus assuming 4 (=2×2) subpixels per pixel.

Figure 10:
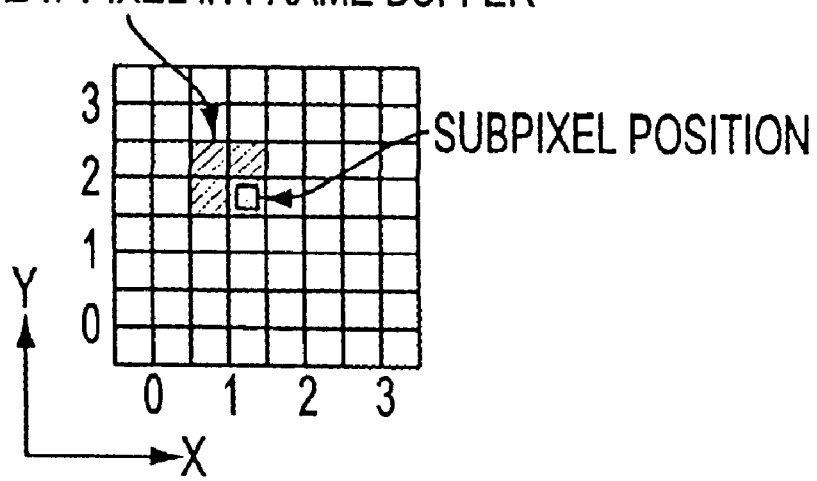
FIG. 10 is a diagram showing the result of drawing when a point is drawn once, without overwriting.
Figure 12:
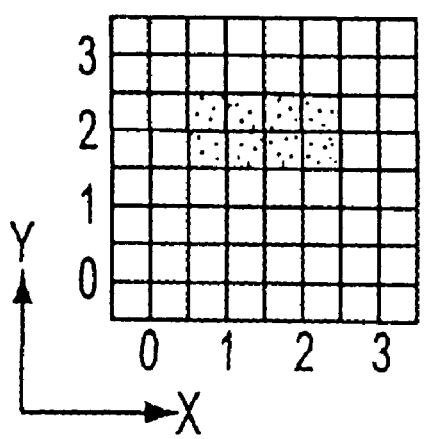
FIG. 12 is a diagram showing the result of overwriting of a point.

As shown in FIG. 10, if for example point (1.6,2.2,Z) is to be drawn (for convenience, we omit the Z coordinate in the following), then properly speaking, point (1.6,2.2) is subpixel-precisioned and is set to point (1.5,2.0) as indicated by the dark circle in FIG. 10. Then the color information that properly speaking is to be written in is written into position (1,2) of the pixel that includes the subpixel that corresponds to point (1.5,2.0), as indicated by the slanting lines in FIG. 10.

Figure 11A:
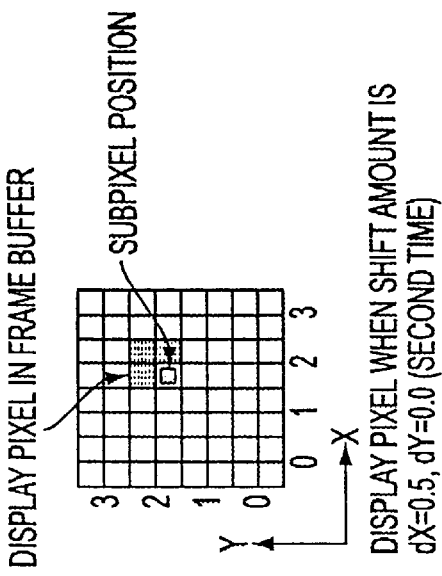
FIGS. 11 (A)–11 (D) show diagrams for explaining the overwriting of a point.
Figure 11B:
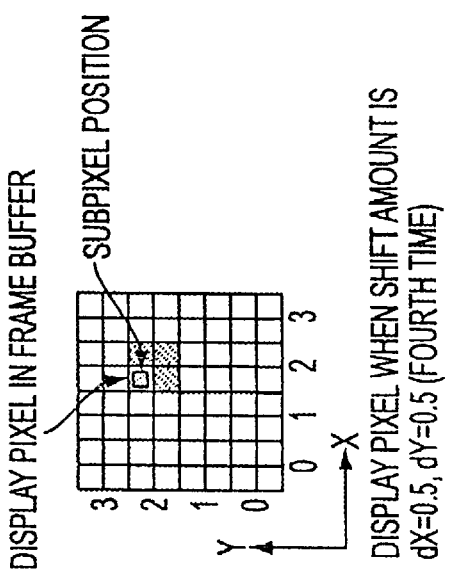
Figure 11C:
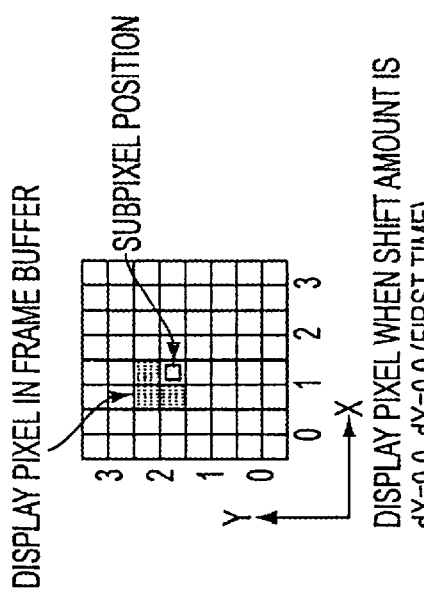
Figure 11D:
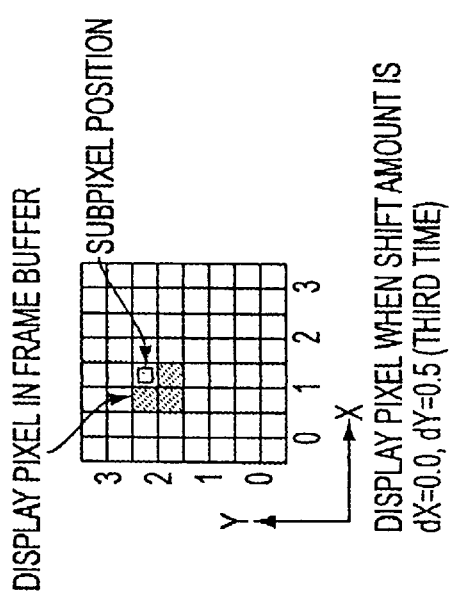

FIGS. 11(A)–11(D) show diagrams for explaining the overwriting of a point. FIG. 11A shows a display pixel when shift amount is dX=0.0, dY=0.0 (first time). FIG. 11(B) shows a display pixel when shift amount is dX=0.5, dY=0.0 (second time). FIG. 11(C) shows a display pixel when shift amount is dX=0.0, dY=0.5 (third time). FIG. 11(D) shows a display pixel when shift amount is dX=0.5, dY=0.5 (fourth time).

With respect to this, with game machine main unit 2 of FIG. 5, initially, GPU 115 sets each of the shift amounts (dX,dY) for the drawing position in the screen coordinate system when drawing is to be done the first through fourth times to, for example, (0.0,0.0), (0.5,0.0), (0.0,0.5), (0.5, 0.5), respectively, which is in subpixel precision (here, ½ of a pixel). Then, in drawing the first time, point (1.6,2.2) is shifted by (0.0,0.0). Then this shifted point (1.6,2.2) is subpixel-precisioned and set to point (1.5,2.0), as indicated by the dark circle in FIG. 11(A). Then color information that is ¼ of the color information that properly speaking is to be written in is written to position (1,2) of the pixel that includes the subpixel that corresponds to point (1.5,2.0), as indicated by the vertical dotted lines in FIG. 11(A).

In drawing the second time, point (1.6,2.2) is shifted by (0.5,0.0). Then this shifted point (2.1,2.2) is subpixel-precisioned and set to point (2.0,2.0), as indicated by the dark circle in FIG. 11(B). Then color information that is ¼ of the color information that properly speaking is to be written in is written to position (2,2) of the pixel that includes the subpixel that corresponds to point (2.0,2.0), as indicated by the horizontal dotted lines in FIG. 11(B).

In drawing the third time, point (1.6,2.2) is shifted by (0.0,0.5). Then this shifted point (1.6,2.7) is subpixel-precisioned and set to point (1.5,2.5), as indicated by the dark circle in FIG. 11(C). Then color information that is ¼ of the color information that properly speaking is to be written in is written to position (1,2) of the pixel that includes the subpixel that corresponds to point (1.5,2.5), as indicated by the slash-slanted dotted lines in FIG. 11(C).

In drawing the fourth time, point (1.6,2.2) is shifted by (0.5,0.5). Then this shifted point (2.1,2.7) is subpixel-precisioned and set to point (2.0,2.5), as indicated by the dark circle in FIG. 11(D). Then color information that is ¼ of the color information that properly speaking is to be written in is written to position (2,2) of the pixel that includes the subpixel that corresponds to point (2.0,2.5), as indicated by the backslash-slanted dotted lines in FIG. 11(D).

The result of drawing point (1.6,2.2) as described above is as shown by the dotted lines in FIG. 12, and as is clear from comparing FIG. 10 and FIG. 12, an antialiasing effect is obtained by performing overwriting.

Here, (0.0,0.0), (0.5,0.0), (0.0,0.5), (0.5,0.5) are used as the shift amounts in both the case in FIGS. 7(A)–7(D) and the case in FIGS. 11(A)–11(D). However, the sequence of the shift amounts used in the four times drawing is done is different (in FIG. 7 they are used in the sequence (0.0,0.0), (0.5,0.0), (0.5,0.5), (0.0,0.5), and in FIG. 11 they are used in the sequence (0.0,0.0), (0.5,0.0), (0.0,0.5), (0.5,0.5)). But the sequence in which these shift amounts are used has no effect on the picture quality due to overwriting.

Also the subpixel precision is different in the case shown in FIGS. 7(A)–7(D) and the case in FIGS. 11(A)–11(D) (in FIGS. 7(A)–7(D) it is ¹⁄₁₆ the precision of a pixel, and in FIGS. 11(A)–11(D) it is ¼ the precision of a pixel), but this too has no effect on the picture quality due to overwriting (if the overwriting is done four times, whether the subpixel precision is ¼ or ¹⁄₁₆ has no effect on the improvement in the picture quality "due to overwriting," and if one considers overwriting, higher subpixel precision yields better picture quality).

Figure 13B:
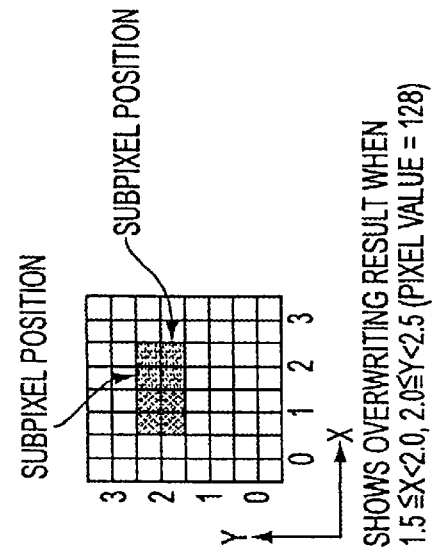
FIGS. 13(A)–13(D) are diagrams for explaining the relationship between the position of a point to be drawn and the result of overwriting.
Figure 13D:
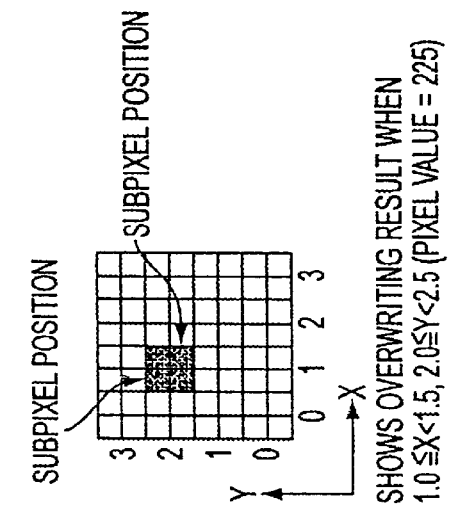
Figure 13A:
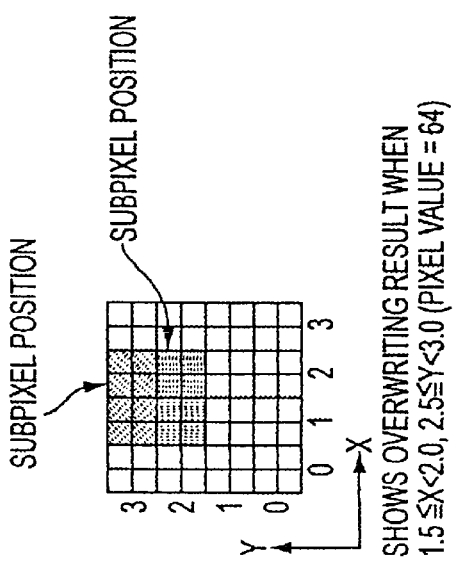
Figure 13C:
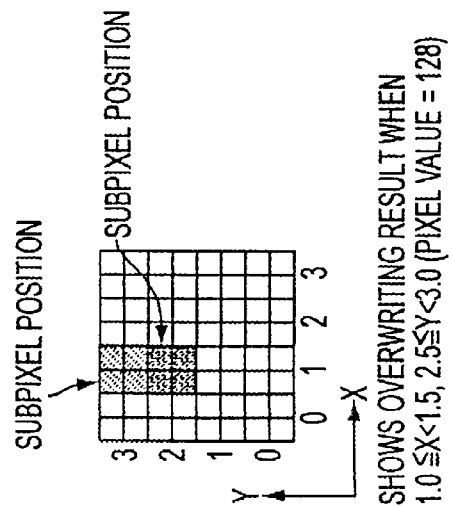

FIGS. 13(A)–13(D) are diagrams for explaining the overwriting. A straight line FIG. 13(A) shows the overwriting result when 1.5≦X<2.0, 2.5≦Y<3.0 (pixel value=64). FIG. 13(B) shows the overwriting result when 1.5≦X<2.0, 2.0≦Y<2.5 (pixel value=128). FIG. 13(C) shows the overwriting result when 1.0≦X<1.5, 2.5≦Y<3.0 (pixel value=128). FIG. 13(D) shows the overwriting result when 1.0<X<1.5, 2.0≦Y<2.5 (pixel value=255).

Also if, as above, the number of overwriting times is set to four times and the shift amounts when the four-time drawing is done are set to (0.0,0.0), (0.5,0.0), (0.0,0.5), (0.5,0.5), when the X or Y coordinate of point (X,Y) is, for example, greater than or equal to 1.5 and less than 2.0 or greater than or equal to 2.5 and less than 3.0, respectively, then the pixels represented by coordinates (1,2), (2,2), (1,3), (2,3) are drawn, respectively, when the drawing is done the first through fourth times, as shown in FIG. 13(A). Since in each of the four times drawing is done, color information that is ¼ of the color information that properly speaking is to be written in is overwritten, if now brightness is represented by 8 bits (0 through 255) and the brightness of point (X,Y) is set to the maximum value of 255, then the brightness of each of the pixels represented by coordinates (1,2), (2,2), (1,3), (2,3) is 64, which is ¼ of 255 (however, here it is assumed that the fractional part is rounded up to the next-greatest integer).

And when the X or Y coordinate of point (X,Y) is, for example, greater than or equal to 1.5 and less than 2.0 or greater than or equal to 2.0 and less than 2.5, respectively, then the pixels represented by coordinates (1,2), (2,2), (1,2), (2,2) are drawn, respectively, when the drawing is done the first through fourth times, as shown in FIG. 13(B). And in this case, since color information that is ¼ of the color information that properly speaking is to be written in is overwritten two times each to the pixels represented by coordinates (1,2) and (2,2), if now brightness is represented by 8 bits and the brightness of point (X,Y) is set to the maximum value of 255, then the brightness of each of the pixels represented by coordinates (1,2) and (2,2) becomes 128. That is, from what was described above, the first drawing is done with a brightness of 64, so the brightness of the pixel to which drawing is done the second time is 128 (=64+64).

Further, when the X or Y coordinate of point (X,Y) is, for example, greater than or equal to 1.0 and less than 1.5 or greater than or equal to 2.5 and less than 3.0, respectively, then the pixels represented by coordinates (1,2), (1,3), (1,2), (1,3) are drawn, respectively, when the drawing is done the first through fourth times, as shown in FIG. 13(C). And in this case, since color information that is ¼ of the color information that properly speaking is to be written in is overwritten two times each to the pixels represented by coordinates (1,2) and (1,3), if now brightness is represented by 8 bits and the brightness of point (X,Y) is set to the maximum value of 255, then the brightness of each of the pixels represented by coordinates (1,2) and (1,3) becomes 128, the same as in the case in FIG. 13(B).

And when the X or Y coordinate of point (X,Y) is, for example, greater than or equal to 1.0 and less than 1.5 or greater than or equal to 2.0 and less than 2.5, respectively, then the pixel represented by coordinates (1,2) is drawn when the drawing is done the first through fourth times, as shown in FIG. 13(D). And in this case, since color information that is ¼ of the color information that properly speaking is to be written in is overwritten four times each to the pixel represented by coordinates (1,2), if now brightness is represented by 8 bits and the brightness of point (X,Y) is set to the maximum value of 255, then the brightness of the pixel represented by coordinates (1,2) becomes 255. That is, from what was described above, the first drawing is done with a brightness of 64, so the brightness of the pixel to which drawing is done the fourth time should properly speaking be 256 (=64+64+64+64), but since the maximum value of the brightness is here set to 255, the 256, which exceeds this value, is clipped to the maximum value 255.

Figure 14A:
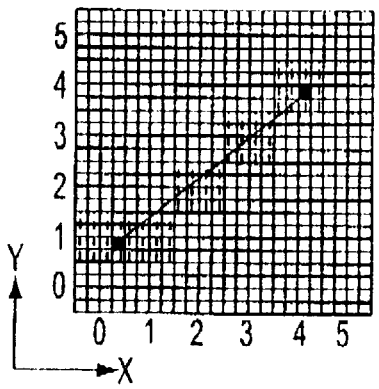
FIGS. 14(A)–14(D) are diagrams for explaining the overwriting of a straight line.
Figure 14B:
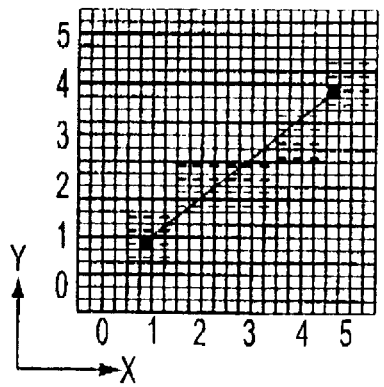
Figure 14C:
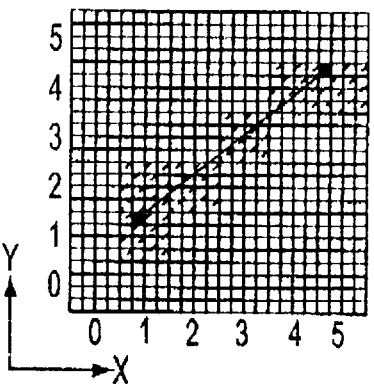
Figure 14D:
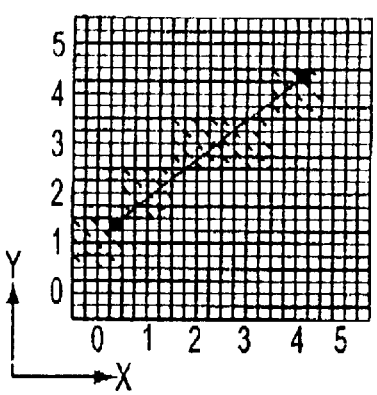
Figure 15:
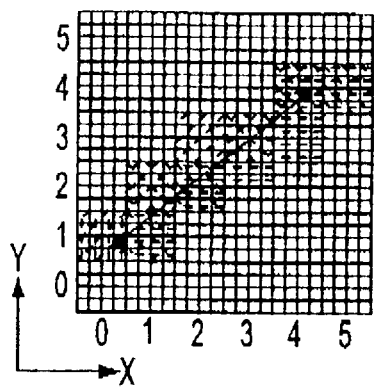
FIG. 15 is a diagram showing the result of overwriting of a straight line.

In the foregoing the drawing of points has been described; next, the drawing of line segments will be described in detail with reference to FIGS. 14(A)–14(D) in which FIG. 14(A) shows the drawing for the first time, FIG. 14(B) shows drawing the second time, FIG. 14(C) shows drawing the third time and FIG. 14(D) shows the drawing the fourth time.

The starting point or ending point of a line segment to be drawn is represented by (x1,y1,z1) or (x2,y2,z2), respectively. It is further stipulated that this starting point and ending point are points in the screen coordinate system after perspective transformation (perspective and projective transformation).

And assuming now for example that the number of overwriting times is set to 4 times and that each pixel is divided into 4 equal parts horizontally and vertically so as to yield 16 subpixels for each pixel, as shown in FIG. 14, GPU 115 sets each of the shift amounts (dX,dY) for the drawing position in the screen coordinate system when a line segment is drawn the first through fourth times to, for example, (0.0,0.0), (0.5,0.0), (0.5,0.5), (0.0,0.5), which is the precision of twice a subpixel (here, ½ of a pixel).

Thereafter, CPU 115 draws the line segment by shifting the drawing position according to the shift amounts (dX, dY).

That is, in drawing for the first time, GPU 115 shifts starting point (x1,y1,z1) and ending point (x2,y2,z2) each by (0.0,0.0) and determines the points interpolated with subpixel precision between the shifted starting point and ending point by DDA (Digital Differential Analysis) operation, which is discussed later, and the color information, etc. at these points. Then, denoting this set of subpixel-precision points by points (X1s,Y1s,Z1s) through (Xns,Yns,Zns), the color information (as stated above, color information that is ¼ the color information properly speaking) is written to the position of the pixels that include the subpixels that correspond to these points (X1s,Y1s,Z1s) through (Xns,Yns,Zns).

And here for example, pixels that include two or more subpixels corresponding to subpixel-precision points that constitute the line segment are to be drawn, and into the pixels that are to be drawn is written, as color information, for example (¼ of) the average value of the color information of the subpixels included in the pixel.

The drawing for the second through fourth times likewise is done in the same way as for the drawing for the first time, except that the shift amounts are set to (0.5,0.0), (0.5,0.5), (0.0,0.5), respectively.

Here, assuming now that the starting point or ending point of the line segment to be drawn was, for example, point (1.6,1.3,z1) or point (4.6,4.3,z2), respectively, then in drawing for the first time, the pixels of the part indicated by the vertical dotted lines in FIG. 14(A) are drawn, in drawing for the second time, the pixels of the part indicated by the horizontal dotted lines in FIG. 14(B) are drawn, in drawing for the third time, the pixels of the part indicated by the slash-slanted dotted lines in FIG. 14(C) are drawn, and in drawing for the fourth time, the pixels of the part indicated by the backslash-slanted dotted lines in FIG. 14(D) are drawn. The result of thus drawing of the line segment is as shown by the dotted lines in FIG. 15.

Next, although 16 subpixels were assumed for each pixel in FIGS. 14(A)–14(D) and FIG. 15, the same sort of overwriting can be done if, for example, each pixel is divided into two equal parts horizontally and vertically as shown in FIGS. 16(A)–16(D), thus assuming 4 subpixels per pixel.

Figure 16A:
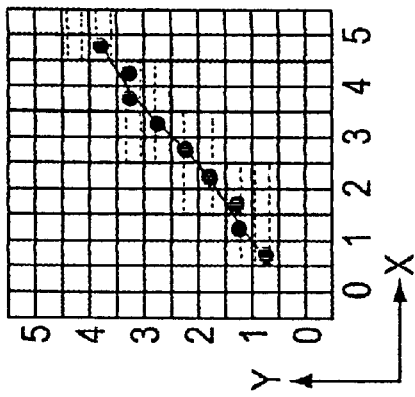
FIGS. 16(A)–16(D) are diagrams for explaining the overwriting of a straight line.
Figure 16B:
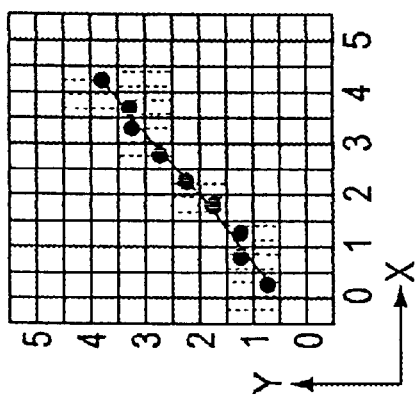
Figure 16C:
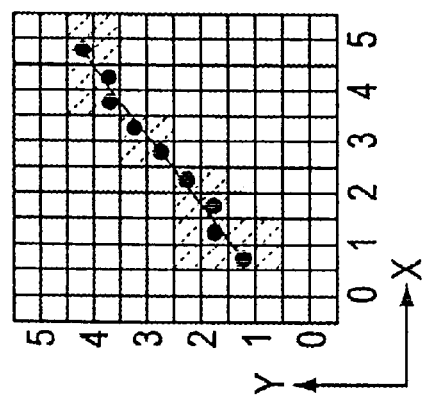
Figure 16D:
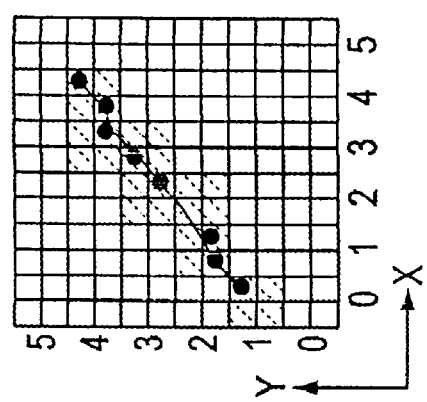

FIG. 16(A) shows display pixels when shift amount is dX=0.0, dY=0.0. FIG. 16(B) shows display pixels when shift amount is dX=0.5, dY=0.0. FIG. 16(C) shows display pixels when shift amount is dX=0.0, dY=0.5. FIG. 16(D) shows display pixels when shift amount is dX=0.5, dY=0.5.

That is, if for example a line segment whose starting point or ending point is point (1.6,1.3,z1) or point (4.6,4.3,z2), respectively, is to be drawn by overwriting four times as in the above case, then if for example (0.0,0.0), (0.5,0.0), (0.0,0.5), (0.5,0.5), which are of subpixel precision (here, the precision of ½ of a pixel), are set, respectively as the shift amounts (dX,dY) of the drawing positions in the screen coordinates when drawing is done the first through fourth times, then in drawing for the first time, the pixels of the part indicated by the vertical dotted lines in FIG. 16(A) are drawn, in drawing for the second time, the pixels of the part indicated by the horizontal dotted lines in FIG. 16(B) are drawn, in drawing for the third time, the pixels of the part indicated by the slash-slanted dotted lines in FIG. 16(C) are drawn, and in drawing for the fourth time, the pixels of the part indicated by the backslash-slanted dotted lines in FIG. 16(D) are drawn.

And here for example, pixels that include one or more subpixels corresponding to subpixel-precision points that constitute the line segment are to be drawn, and into the pixels that are to be drawn is written, as color information, for example (¼ of) the average value of the color information of the subpixels included in the pixel.

The results of drawing the line segment by overwriting as described above are as shown by the dotted lines in FIG. 17(A).

Figure 17A:
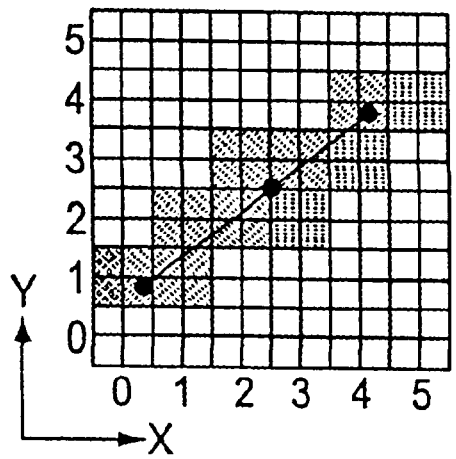
FIGS. 17(A) and 17(B) are diagrams showing the result of overwriting of a straight line.

In FIG. 17(A) antialias straight line is generated four times. The subpixel DDA result is shown and the display pixels which include the effective subpixels are shown.

Figure 17B:
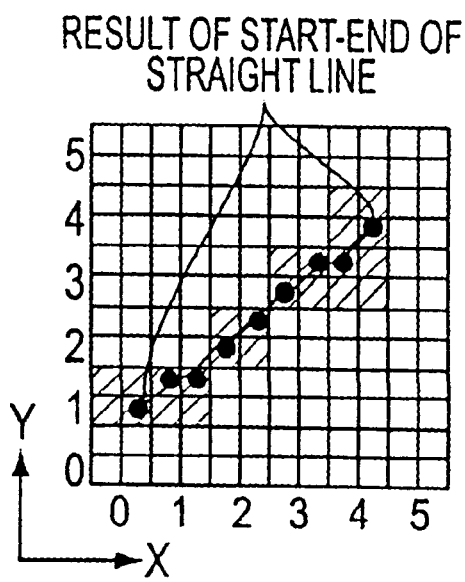

By contrast, if the same line segment is drawn by one-time drawing, the results of the drawing will be as indicated by the slanting lines in FIG. 17(B). As is clear from FIGS. 17(A)–17(B), aliasing is reduced by performing overwriting.

Next, referring to the flowchart shown in FIG. 18, the polygon drawing processing done in game machine main unit 2 of FIG. 5 will be described. Here the data required to draw a polygon, including data about its shape and data about the light source, is assumed to already have been read by main CPU 111 from CD-ROM 51 and stored in main memory 112.

In drawing processing, first, in step S1, main CPU 111 reads via main bus 101 for example the data for drawing the polygons that comprise one frame of a three-dimensional image and supplies it to GTE 117. With GTE 117, in step S2 geometry processing is done on each of the polygons in three-dimensional space based on the viewpoint, and the geometry-processed data is perspective-transformed. Here the viewpoint is given by, for example, the user's operation of the operation device 17 (FIG. 1).

Thereafter, proceeding to step S3, the polygon data is determined in main CPU 111 by performing brightness calculations and texture address calculations for the polygons in the screen coordinate system after they have been perspective-transformed, and they are supplied to GPU via main bus 101.

Here the polygon data includes, for example, X, Y, Z, R, G, B, α, S, T, Q, F.

Among polygon data X, Y, Z, R, G, B, α, S, T, Q, the data X, Y, Z represent, respectively, the X, Y, Z coordinates of each of the three vertices of a triangular polygon, and R, G, B represent the red, green, and blue brightness value, respectively, of the three vertices.

Also, α represents a blend coefficient that represents the ratio of the blend if the RGB values of the pixel to be drawn and the RGB values of the already drawn pixel are to be α-blended. And a is for example a real number greater than or equal to 0 and less than or equal to 1, and when the pixel values (RGB values) of the pixel to be drawn is denoted by $F_c$ and the pixel values of the already drawn pixel is denoted by $B_c$, then the pixel value $C_c$ obtained as a result of α-blending them is given for example by the following equation.

$$C_c = \alpha F_c + (1-\alpha) B_c$$

S, T, Q represent the texture coordinates (homogeneous coordinates for texture) in each of the three vertices of a triangular polygon. That is, here a pattern (texture) is applied to the surface of an object by texture mapping, and S, T, Q are used in this texture mapping. The value obtained by multiplying S/Q, T/Q, respectively, by the texture size becomes the texture address.

F is a fog value that represents the degree of fogginess when the pixel to be drawn is to be made foggy; for example, the higher this value is, the foggier it is displayed.

After the polygon data has been determined, we proceed to step S4, where the time for drawing one frame is estimated in main CPU 111. That is, main CPU 111 estimates from the number of polygons for which data was read in step S1, that is, from the number of polygons to be drawn in one frame, the drawing time needed for drawing the one frame, for example, one time. Then, in step S5, main CPU 111 determines the number of overwriting times N based on the drawing time estimated in step S4, and supplies it to GPU 115 via main bus 101.

Here, in the case of FIGS. 7(A)–7(D) through FIGS. 17(A)–17(B), the overwriting number of times is set to a fixed value, four times, but if the overwriting number of times is set to a fixed value, the drawing might not be completed in the time for one frame if the number of polygons that constitute a frame is enormous, and then the processing will fail. On the other hand, if one ignores the dynamic range of RGB values and the subpixel precision, the greater the number of overwriting times, the better the resolution. So in this embodiment, the number of overwriting times N is determined adaptively based on the drawing time for one frame, so that overwriting is done as many times as possible within a range that ensures that processing will not fail (here, a range at which the frame rate can be maintained).

But if the number of polygons that comprise a frame is limited, then the overwriting number of times may be set to a fixed value that ensures that processing will not fail. And the effect that overwriting has on improving the picture quality is theoretically greatest if overwriting is done as many times as the number of subpixels that make up a pixel, with no additional effect obtained if the number of overwriting times is increased beyond this. Therefore in a case where the processing capacity of the equipment is sufficient and processing will not fail even if the overwriting number of times is set to greater than the number of subpixels that comprise a pixel, it is desirable that the number of overwriting times be set to the same as the number of subpixels that comprise a pixel, so as to avoid "wasteful" processing. For the same reason, even if the overwriting number of times is determined adaptively, it is desirable, when that number of times becomes greater than the number of subpixels that comprise a pixel, to limit it to the number of subpixels that comprise a pixel.

When the overwriting number of times N is determined, we proceed to step S6, in which main CPU 111 sets the shift amounts (dX,dY) used for each drawing time in the event that drawing is done as many times as the overwriting number of times N, and supplies them to GPU 115. It is desirable that the shift amounts be set to subpixel precision or better, and smaller than the precision of one pixel.

When GPU 115 receives the polygon data for one frame supplied from CPU 111 as described above, the overwriting number of times N, and the shift amounts for the overwriting number of times, then in step S7 a Z sort is performed to sort the polygons that comprise one frame into order by their depth direction. Here the details of a Z sort are disclosed in, for example, unexamined patent application H7-114654 (1995).

Then GPU 115, in step S8, clears frame buffer 141 to, for example, 0, then proceeds to step S9 and initializes the variable n, which counts the drawing number of times, to, for example, 1. Then, proceeding to step S10, GPU 115 corrects the shift amounts used for drawing each polygon the n-th time based on its movement.

Here the polygon data includes, besides the data mentioned above, polygon motion vectors. Supposing now that the movement vector of a given polygon is (vx,vy) and that (dXn,dYn) is set as the shift amount used for drawing the polygon the n-th time, the shift amount (dXn,dYn) is corrected to, for example, (dXn+vx/N,dYn+vy/N). By drawing with the shift amounts corrected in this way, a motion blur effect can be obtained.

After correction of the shift amounts, we proceed to step S11, in which GPU 115 shifts the coordinates of the vertices of each polygon by the corrected shift amount, then we proceed to step S12. In step S12, Z buffer 142 is initialized in GPU 115 to, for example, +∞ (assuming here that the Z value grows larger the deeper into the screen a point is), then we proceed to step S13. In step S13, the coordinates of the polygon vertices are subpixel-precisioned, and, by performing DDA arithmetic operation in subpixel precision, the RGB values, etc. of the subpixels that constitute the edges and interiors of the polygon are determined.

Here, DDA arithmetic operation means arithmetic operation that between two points determines, by linear interpolation, each value (RGB value, etc.) for the pixels that constitute the line segment that joins the two points. That is, for example when one of the two points is taken as the starting point and the other as the ending point and the starting point and ending point are assigned certain values, then the proportional change (ratio of change) in the values assigned to the starting point and ending point is determined by dividing the difference between the value assigned to the starting point and the value assigned to the ending point by the number of pixels that lie between the starting point and the ending point, and the value of each pixel that lies between the starting point and the ending point is determined by successively adding (integrating) this to the value assigned to the starting point as one proceeds from the starting point to the ending point.

For example, assuming that pixels p1, p2, p3 are given as the three vertices of a triangular polygon, such a DDA arithmetic operation is performed with subpixel precision with respect to subpixels p1 and p2, subpixels p2 and p3, and subpixels p1 and p3, thereby taking the X, Y coordinates as variables and determining the polygon data Z, R, G, B, α, S, T, Q for the subpixels along the three edges of the polygon as well as the polygon data Z, R, G, B, α, S, T, Q for the subpixels that lie in the interior of the polygon.

Proceeding to step S14, overwriting processing is done whereby, in GPU 115, the RGB values of the pixels that constitute the polygon are written to frame buffer 141 using Z buffer 142.

Here the ultimate RGB values written to frame buffer 141 in step S14 are determined in GPU 115 in, for example, the following way.

Namely, GPU 115 performs texture mapping based on the polygon data X, Y, Z, R, G, B, α, S, T, Q for the subpixels that constitute the polygon, which are the result of the DDA arithmetic operation. Specifically, CPU 115 computes texture address U(S/Q),V(T/Q) by, for example, dividing S, T each by Q, and by doing various filtering processing as necessary, it computes the texture color at the X, Y coordinates of each subpixel. That is, GPU 115 reads from texture memory 143 the texture data (Texture Color Data) corresponding to texture address U, V. In addition, GPU 115 performs various filtering processing on RGB values as this texture data and on RGB values as the results of DDA arithmetic operation; that is, for example, it mixes the two in a prescribed proportion, mixes a preset color in accordance with the fog value F, and calculates the final RGB values of each subpixel that constitutes the polygon.

In step S14, the RGB values determined as described above are written to frame buffer 141.

As a general rule, the writing to frame buffer 141 is done in sequence, from nearest to the viewpoint to farthest, for the polygons that were Z-sorted in step S7 according to their depth direction. The reason for this is stated below.

If just one of the subpixels that constitute a pixel is to be drawn, the RGB values of that subpixel are written into the address in frame buffer 141 that corresponds to the pixel that includes that subpixel, but if more than one of the subpixels that constitute a pixel are to be drawn, the RGB values of the multiple subpixels, for example their average value, are written to it.

In step S14, when the writing to frame buffer 141 of the RGB values for one frame is completed, control proceeds to step S15, where it is determined whether variable n is greater than the writing number of times N, and if it is decided that it is not greater, control proceeds to step S16, in which variable n is incremented by 1, then control returns to step S10. Then, in step S10, GPU 115 corrects the shift amounts used for drawing each polygon the n-th time based on its movement, and thereafter the processing of steps S10 through S16 is repeated until it is decided in step S15 that variable n is greater than overwriting number of times N. In this way, the overwriting is done.

On the other hand, if in step S15 it is decided that variable n is greater than overwriting number of times N, that is, if overwriting has been done N times for the one frame, GPU 115 reads the RGB values for the one frame that are stored in frame buffer 141, outputs them to the display, and returns to step S1. Then, in step S1, main CPU 111 reads from main memory 112 via main bus 101 the data for drawing the polygons that constitute the three-dimensional image of the next frame, and thereafter the same processing is repeated, thereby displaying a moving image.

Next, the writing to frame buffer 141 is done as described above in sequence, from nearest to the viewpoint to farthest, for the polygons that were Z-sorted according to their depth direction; this is due to the fact that, as stated below, the writing of the RGB values to frame buffer 141 is done by overwriting, in which they are added to the RGB values previously written in frame buffer 141.

Figure 19B:
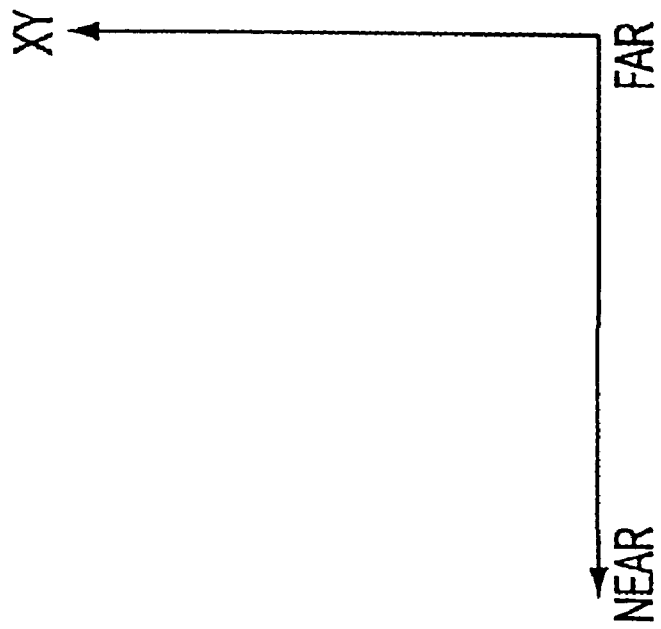
FIGS. 19(A) and 19(B) are diagrams for explaining the reason for drawing in sequence, starting with polygons near to the viewpoint.
Figure 19A:
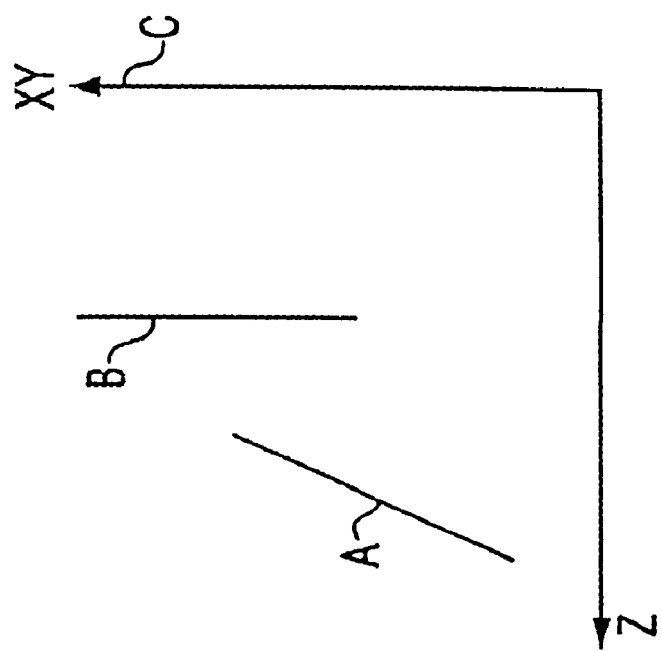

That is, now, consider the situation shown in FIG. 19(A), in which for example frame C, which includes polygons A and B, has already been written to frame buffer 141, and a further frame C consisting of polygons A and B is to be overwritten to frame buffer 141 in this state. Also assume that polygon A is positioned at greater depth than polygon B and that polygons A and B partly overlap.

Figure 18:
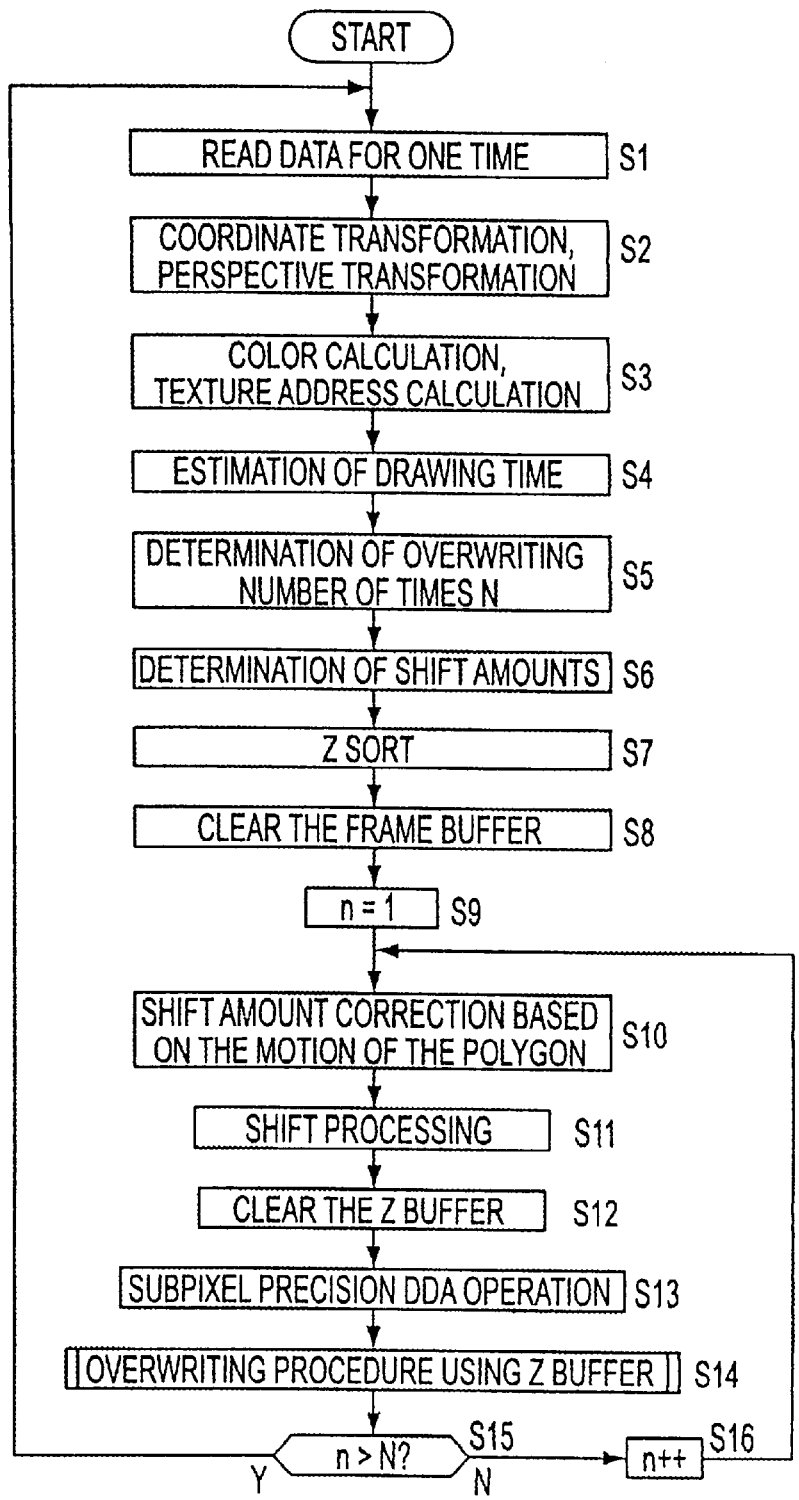
FIG. 18 is a flowchart for explaining the drawing processing of polygons in the game machine main unit shown in FIG. 5.

In this case, because Z buffer 142 is cleared in step S12 before the overwriting processing is done in step S14 as explained in the flowchart of FIG. 18, after the entire frame C is written to frame buffer 141, Z buffer 142 is in a state in which a value corresponding to infinitely far (greatest depth) is written in as the Z value, as shown in FIG. 19(B).

Figure 20B:
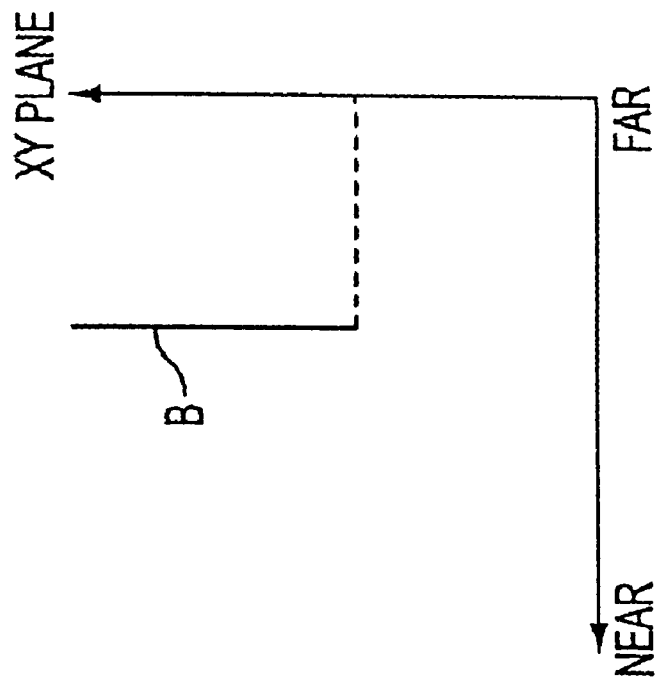
FIGS. 20(A) and 20(B) are diagrams for explaining the case in which drawing is done in sequence, starting with polygons far from the viewpoint.
Figure 20A:
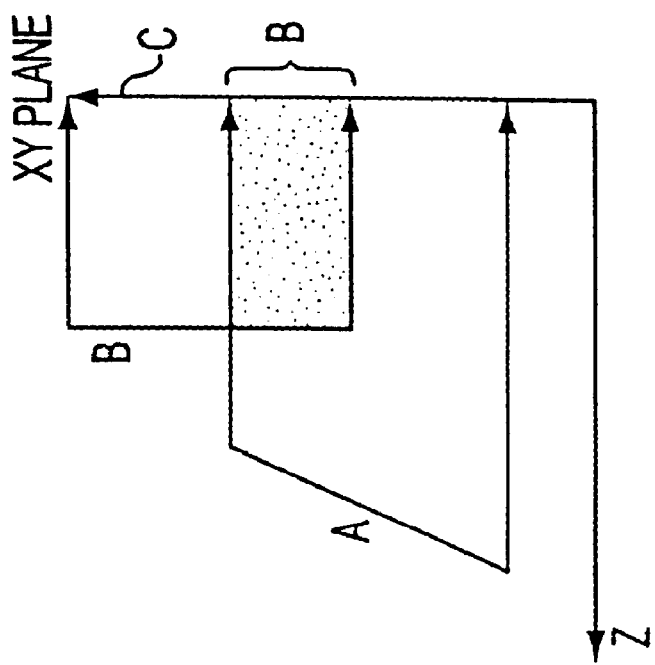
Figures 21A, 21B:
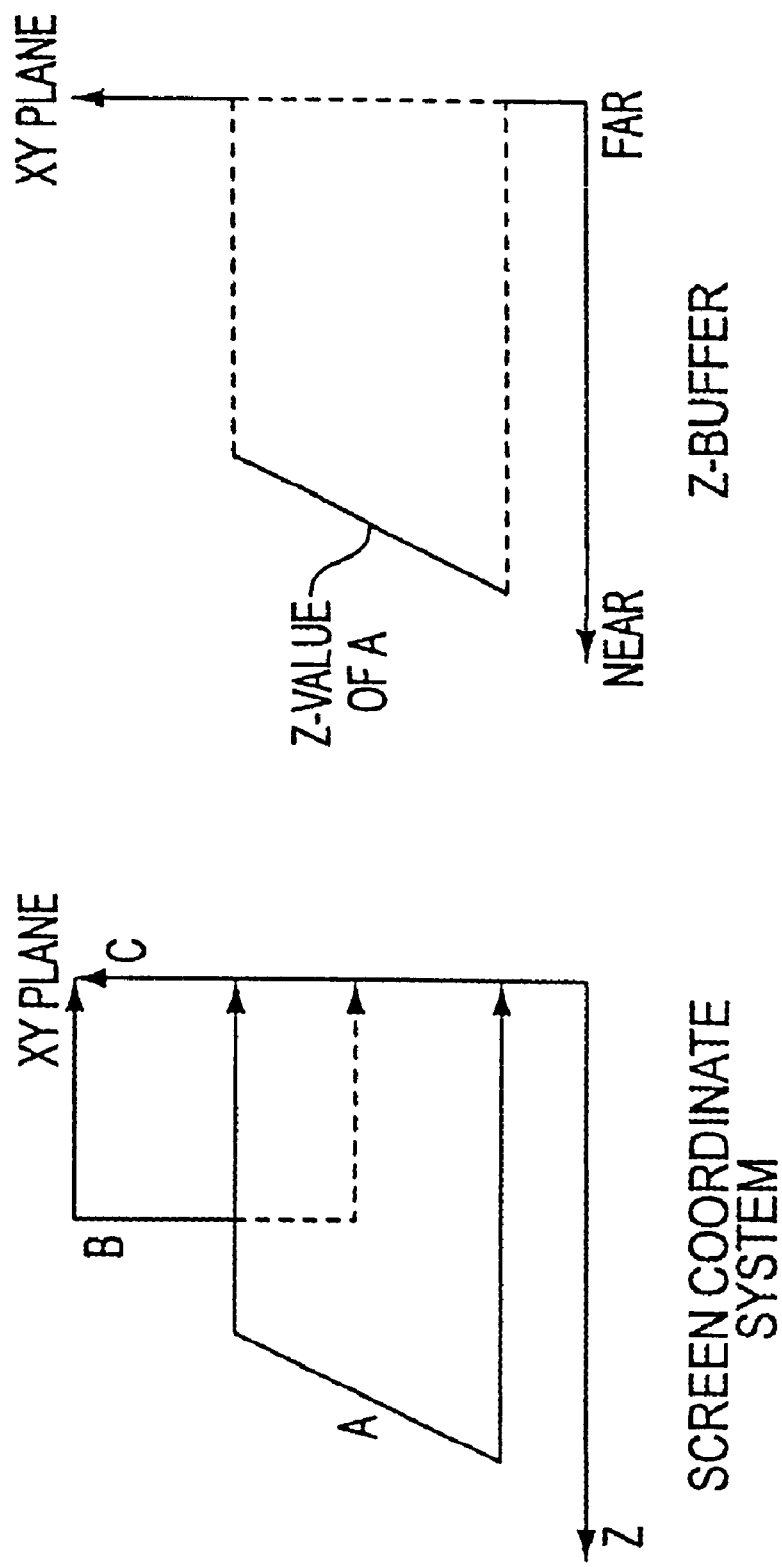
FIGS. 21(A) and 21(B) are diagrams for explaining the case in which drawing is done in sequence, starting with polygons near to the viewpoint.

Now, as between polygon A or B, if for example polygon B, which lies on the depth side, is written first, and polygon A, which lies on the viewer's side, is written thereafter, then at the time when polygon B is drawn, the Z value recorded in Z buffer 142 represents infinite distance, so by drawing polygon B using Z buffer 142, that is, by adding the RGB values of polygon B to the RGB values already stored in frame buffer 141, the polygon B part of frame C already drawn in frame buffer 141 is overwritten, as shown in FIG. 20(A). In this case, the Z value of polygon B is written into the part of Z buffer 142 that corresponds to polygon B.

If thereafter polygon A is written to frame buffer 141 using Z buffer 142, the drawing of polygon A, which lies this side of polygon B, is not prevented by Z buffer 142, and therefore the entire polygon A is written to frame buffer 141. That is, all the RGB values of polygon B are added to the RGB values already stored in frame buffer 141. As a result, the overlapping part of polygons A and B (the part shaded in FIG. 20) is affected by the drawing of polygon B, even though properly speaking only polygon A should be drawn.

If overwriting is to be done as described above (in which the RGB values of a polygon are added to the RGB values previously written in frame buffer 141), then when a polygon that lies farther away is drawn before a polygon that lies nearer, their overlapping part will be affected by the polygon that lies farther away, and the polygon that lies farther away, which should be hidden-surface erased by the polygon that lies nearer, remains visible.

Thus in order to prevent this failure to perform such hidden-surface erasure, as explained in FIG. 18, in this embodiment the drawing of polygons is done for polygons Z-sorted according to their depth, in sequence beginning with those nearest to the viewpoint.

That is, for example in the above-described case, as between polygons A and B, polygon A, which lies nearer, is drawn first, and thereafter polygon B, which lies farther away, is drawn. In this case, at the time polygon A is drawn, the Z value stored in Z buffer 142 represents infinite distance, so by drawing polygon A using Z buffer 142, that is, by adding the RGB values of polygon A to the RGB values already stored in frame buffer 141, the polygon A part of frame C already drawn in frame buffer 141 is overwritten. In this case, the Z value of polygon A is written to the part of Z buffer 142 that corresponds to polygon A.

If thereafter polygon B is written to frame buffer 141 using Z buffer 142, the drawing of polygon B, which lies farther away than polygon A, is prevented by Z buffer 142 for that part that overlaps with polygon A, and therefore the part of polygon B that does not overlap with polygon A is overwritten in frame buffer 141, but the part that overlaps with polygon A is not overwritten in frame buffer 141 (is not drawn). The result of this is that for the part that overlaps between polygons A and B, only polygon A, which lies nearer, is drawn, preventing the occurrence of any effect by polygon B. That is, hidden-surface erasure can be done surely.

Also, hidden-surface erasure in the case where overwriting is done, besides being done by combination of Z sort and Z buffer 142 as above, can also be done by having a buffer (in the following referred to, for convenience, as the second frame buffer) of the same kind as frame buffer 141. That is, it suffices to draw to the second frame buffer using Z buffer 142 and overwrite the results of the second frame buffer in frame buffer 141. However, in this case, doing a Z sort is no longer necessary, but the second frame buffer must have the same capacity as frame buffer 141.

And the combination of Z sort and Z buffer 142, besides being used for doing overwriting, may also be used for generating natural images in cases where drawing is to be done with a blending, for example in cases where a semitransparent polygon is to be drawn or in cases where a shadow is to be drawn (for example, for semitransparent polygons using the combination of Z sort and Z buffer, a disclosure is made in, for example, patent application H8-158145 (1996), which was previously filed by the present applicant). But the processing done using the combination of Z sort and Z buffer differs between cases in which hidden-line erasure is to be done when overwriting is done and cases in which semitransparent polygons are to be drawn, so switching between processing algorithms must be done in accordance with the particular case.

Figure 22:
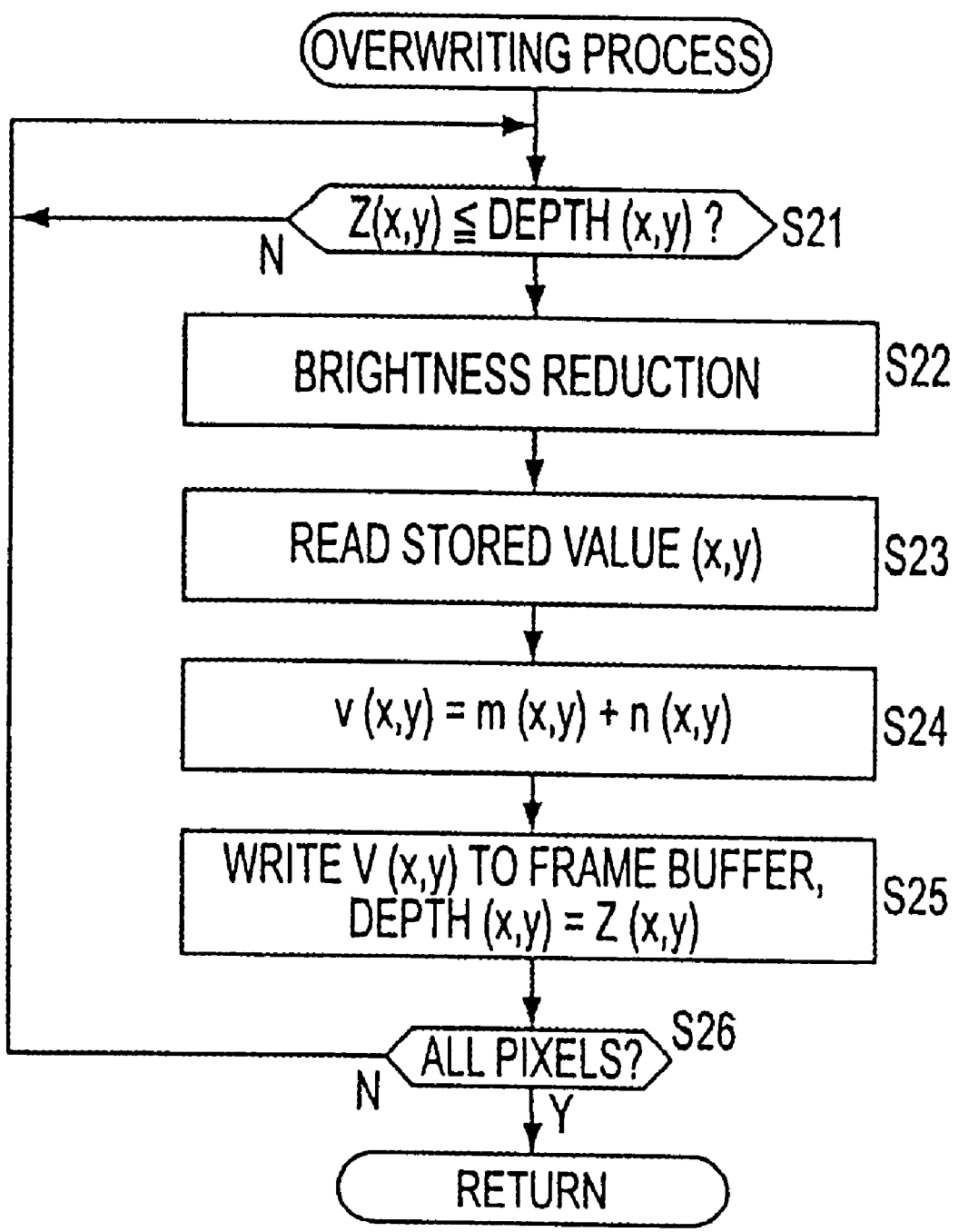
FIG. 22 is a flowchart for explaining in greater detail the processing of step S14 shown in FIG. 18.

Next, referring to the flowchart of FIG. 22, we describe the details of the overwriting processing in step S14. Here, in order to simplify the explanation, we assume that the Z values and RGB values are already assigned to pixel units, without considering subpixels. Also, we denote by $p(x,y)$ the pixel at the position x units from the left and y units from the bottom, we denote by $Z(x,y)$ the Z value of this pixel $p(x,y)$, and we denote by $depth(x,y)$ the stored value corresponding to pixel $p(x,y)$ that is stored in Z buffer 142. Also, we denote by $n(x,y)$ the stored value in the location of frame buffer 141 that corresponds to pixel $p(x,y)$.

In overwriting processing, first, in step S21, a prescribed pixel $p(x,y)$ among the pixels that constitute the frame to be drawn now is taken as the pixel of interest, and it is decided whether the Z value $Z(x,y)$ of this pixel of interest $p(x,y)$ is less than or equal to the value $depth(x,y)$ stored in Z buffer 142. In step S21, if it is decided that Z value $Z(x,y)$ is not less than the stored value $depth(x,y)$, that is, if there is a polygon that is nearer than the polygon that is composed including pixel of interest $p(x,y)$ and it has not already been written to frame buffer 141, control returns to step S21, a pixel that has not yet been made a pixel of interest is newly made a pixel of interest, and thereafter the same processing is repeated.

Also, in step S21, if it is decided that Z value $Z(x,y)$ is less than or equal to stored valued $depth(x,y)$, control proceeds to step S22, and brightness reduction processing is done. That is, if the RGB value of pixel of interest $p(x,y)$ is denoted by $M(x,y)$, RGB value $M(x,y)$ is divided by overwriting number of times N, and the quotient (but here with the decimal part discarded) is determined as the RGB value $m(x,y)$ to be overwritten.

And if the greatest integer less than or equal to x/y is denoted by $INT[x/y]$, in the brightness reduction processing, calculations are done that are indicated by the formula m(x,y)=INT[M(x,y)/N].

There is no problem here if M(x,y)/N turns out to be an integer, but if it contains a fractional part, brightness reduction occurs. That is, if for example the maximum brightness value is 255, if one considers drawing at this maximum brightness value of 255 by overwriting four times, the brightness value of the drawing each time becomes, by brightness reduction processing, 63 (=INT[255/4]). Therefore even if drawing at a brightness value of 63 is done four times, that is, if 63 is added four times, the result is only 252, which is less than the original brightness value of 255.

Thus if N times the value INT[M(x,y)/N] obtained by brightness reduction processing is less than the original RGB value M(x,y), the RGB value m(x,y) to be overwritten can be set to the sum obtained by adding a prescribed correction value D to the value INT[M(x,y)/N].

Correction value D must be set to a value such that N times the sum of value INT[M(x,y)/N] plus this correction value D is greater than or equal to the original RGB value M(x,y). Specifically if, as described above, drawing is done at a brightness value of 255, which is the maximum value, by overwriting four times, then correction value D is set to, for example, 1. In this case, the brightness value of the drawing each time becomes 64 (=63+1), and if drawing at a brightness value of 64 is done four times, the result will be 256. Here the maximum brightness value is 255, and a value that exceeds this is clipped to the maximum value 255.

After brightness reduction processing, in step S23 the stored value n(x,y) that corresponds to pixel of interest p(x,y) is read from frame buffer 141, control proceeds to step S24, and overwriting is done by adding it with the RGB value m(x,y) obtained after brightness reduction processing. Here the result of the addition is denoted by v(x,y).

In step S25, the result of the addition in step S24, that is, the overwriting result v(x,y), is overwritten into the location in frame buffer 141 where n(x,y) is stored (the location corresponding to pixel of interest p(x,y)). This v(x,y) is read as recorded value n(x,y) when pixel p(x,y) is next drawn.

Also, in step S25, recorded value depth(x,y) in Z buffer 142 is rewritten to Z value Z(x,y), and control proceeds to step S26, in which it is decided whether all the pixels that comprise the frame to be drawn have been processed as pixels of interest. In step S26, if it is decided that not all the pixels that comprise the frame to be drawn have been made a pixel of interest, control returns to step S21, a pixel that has not yet been made a pixel of interest is newly made a pixel of interest, and thereafter the same processing is repeated.

If, on the other hand, it is decided in step S26 that all the pixels that comprise the frame to be drawn have been made a pixel of interest, a return is executed.

Here, brightness reduction processing may be done using α blending. That is, m(x,y) may be determined by setting blend coefficient α to 1/N and computing formula m(x,y)=INT[α×M(x,y)]. That is, now, blend coefficient a makes 1.0 correspond to, for example, 128 (=$2^7$), and it is realized by the formula α=A→7, where A is an integer in the range 0–128 and A→ represents a 7-bit right shift of A.

In this case, in order for example to draw at the maximum brightness value of 255 by overwriting four times as described above, it suffices to set A to 32, which corresponds to ¼, and calculate the formula m(x,y)=INT[α×M(x,y)].

But even in this case, as in the case described above, reduction of brightness sometimes occurs. That is, if drawing at the maximum brightness value of 255 is done by overwriting four times, if A is set to 32, which corresponds to ¼, and the formula m(x,y)=INT[α×M(x,y)] is calculated, then the value m(x,y) comes to 63 (=INT[(255×32)→7]), and even if drawing at a brightness value of 63 is done four times, the result is only 252, which is less than the original brightness value of 255.

Thus if N times INT[α×M(x,y)] is less than the original RGB value M(x,y), A is corrected so that N times INT[α×M(x,y)] is greater than or equal to the original RGB value M(x,y). Specifically, it suffices to correct A to, for example, 33, which is 1 more than the 32 that corresponds to ¼. If this is done, the brightness value for drawing one time becomes 65 (=INT[(255×33)→7]), and if drawing at a brightness value of 65 is done four times, 260 results. And a value that exceeds 255, which is the maximum brightness value, is clipped to the maximum value 255.

As described above, the image is overwritten by setting multiple shift amounts for shifting, with a precision finer than one pixel, the drawing position when the RGB value of each pixel is to be drawn to frame buffer 141 and by drawing the RGB values to the respective locations in frame buffer 141, and thus effective antialiasing can be done even without using a high-capacity, high-speed frame buffer or Z buffer.

That is, the antialiasing effect achieved by overwriting as described above extends not just to the edges of polygons but also to their interior and to the parts where three-dimensional shapes intersect each other, which not only reduces the jaggedness that occurs in straight lines but also improves the picture quality of the image as a whole.

And because a moving polygon can be given a motion blur effect, it is possible to display smooth moving images without any flickering.

In the foregoing, this invention was described for the case in which it is applied to a video game machine, but this invention may also be applied to effectors that give images special effects or to CAD and other devices that perform computer graphics processing. In addition, this invention may also be applied to, for example, recording and playback devices or transmission devices that encode natural images taken with, for example, a video camera and that record and play them back or transmit and receive them. That is, if in the future natural images taken with a video camera are encoded so as to be expressed by polygons, when they are played back, natural images of high picture quality can be played back by using the technique of this invention.

In this embodiment, drawing processing was done in frame units, but drawing processing may also be done in field units.

This invention may also be applied to drawing either moving images or still images.

In this embodiment, the description applied to drawing three-dimensional graphics, but this invention may also be applied to, for example, drawing two-dimensional graphics.

The shift amount is not limited to subpixel precision but may be larger or smaller.

Also, in this embodiment the computer programs for performing the above-described drawing processing are provided recorded on CD-ROM 51. However, besides being provided by means of CD-ROM, optomagnetic disk, or other recording medium, the computer programs may also be provided by, for example, Internet, satellite circuit, or other transmission medium.

And the drawing processing need not be done by having a processor execute computer programs but may also be done on specialized hardware.

In this embodiment, three-dimensional images are displayed on a monitor display, but this invention may also be applied to other cases, such as, for example, printing three-dimensional images on a printer (a two-dimensional output device).

In this embodiment, drawing a one-frame image is done by shifting in both the X and Y directions, but it is also possible to do shifting in only one of these directions. That is, shifting amounts (dX,dY) may be set to, for example, (0.0,−0.2), (0.0,−0.1), (0.0,0.1), (0.0,0.2).

Also, shift amount (dX,dY) may be predetermined, for example, for each overwriting number of times.

As described above, the greater the number of overwrites, the greater the improvement in the resolution, but as the number of overwrites is increased, the number of bits by which the RGB value drawn one time is reduced due to brightness reduction processing, and this worsens the gradation (grayscale) of the image. Therefore it is desirable that the number of overwrites be set not just from the standpoint of resolution, but in consideration of the gradation as well.

With the drawing device and drawing method of this invention, multiple shift amounts are set for shifting, with precision finer than one pixel, the drawing position when pixel data is to be drawn to a pixel data memory means, and the image is overwritten by drawing pixel data to each location in the pixel data memory means that corresponds to the multiple shift amounts. Also, with the distribution medium of this invention, computer programs are provided for overwriting images by setting multiple shift amounts for shifting, with precision finer than one pixel, and by drawing the pixel data to each memory location corresponding to the multiple shift amounts. Therefore it becomes possible to reduce the aliasing that occurs in the image.

What is claimed is:

1. A drawing device for drawing an image to be displayed on an image device, comprising:

a pixel data memory means for storing pixel data to be output to a two-dimensional output device for outputting said image;

a shift amount setting means for setting multiple shift amounts and shifting, with a precision finer than one pixel, a drawing position when said pixel data is to be drawn in said pixel data memory means; and a drawing means in said pixel data memory means for overwriting said image by drawing said pixel data in each position corresponding to the multiple shift amounts set by said shift amount setting means.

2. The drawing device as described in claim 1, wherein if said pixel data is required in subpixel units, said shift amount setting means sets multiple shift amounts for shifting said drawing position of said pixel data with subpixel precision.

3. The drawing device as described in claim 1, wherein said drawing means includes a count determination means for determining the number of overwriting times to overwrite said image.

4. The drawing device as described in claim 3, wherein said drawing means further includes an estimation means for estimating a drawing time needed for drawing one screenful of said pixel data to said pixel data memory means, and said count determination means determines said number of overwriting times based on said drawing time estimated by said estimation means.

5. The drawing device as described in claim 3, wherein if said pixel data is required in subpixel units, said count determination means determines said number of overwriting times based on the number of subpixels which constitute one pixel.

6. The drawing device as described in claim 1, wherein if said image is a moving image, the drawing device further comprises a correction means for correcting said shift amounts based on the movement of said moving image.

7. The drawing device as described in claim 6, wherein if said image is defined by a combination of unit graphic forms, said correction means corrects said shift amounts based on the movement of said unit graphic forms.

8. The drawing device as described in claim 1, wherein if said image is a three-dimensional image defined by a combination of unit graphic forms, the drawing device further comprises a sorting means for sorting said unit graphic forms into the order of depth direction thereof, and said drawing means draws said unit graphic forms in order, beginning with those near the viewpoint.

9. The drawing device as described in claim 1, wherein said drawing means draws once based on a value obtained by dividing said pixel data by the overwriting number of times of said image with respect to said pixel data memory means.

10. The drawing device as described in claim 9, wherein if said pixel data or overwriting number of times is denoted by M or N, respectively, and the greatest integer less than or equal to x/y is denoted by INT[x/y], for one drawing, said drawing means writes into said pixel data memory means a value obtained by adding a prescribed correction value to the value denoted by INT[M/N].

11. The drawing device as described in claim 10, wherein if the value denoted by INT[M/N]×N is less than M, said correction value is a value such that N times the value obtained by adding the correction value to INT[M/N] is greater than or equal to M.

12. The drawing device as described in claim 1, and further comprising:

an operation means which is operated when a prescribed input is given thereto, an arithmetic operation means for reading in data recorded in a storage medium and performing prescribed arithmetic operations using said recorded data, based on input from said operation means; and a pixel data generation means for determining said pixel data based on the results of the arithmetic operations by said arithmetic operation means.

13. The drawing device as described in claim 12, wherein if said pixel data is determined in subpixel units, said shift amount setting means sets multiple shift amounts for shifting said drawing position of said pixel data with subpixel precision.

14. The drawing device as described in claim 12, wherein said drawing means further includes a count determination means for determining the number of overwriting times to overwrite said image.

15. The drawing device as described in claim 14, wherein said drawing means further includes an estimation means for estimating a drawing time needed for drawing one screenful of said pixel data to said pixel data memory means, and said count determination means determines said number of overwriting times based on said drawing time estimated by said estimation means.

16. The drawing device as described in claim 14, wherein if said pixel data is required in subpixel units, said count determination means determines said number of overwriting times based on the number of subpixels which constitute one pixel.

17. The drawing device as described in claim 12, wherein if said image is a moving image, the drawing device further comprises a correction means for correcting said shift amounts based on the movement of said moving image.

18. The drawing device as described in claim 17, wherein if said image is defined by a combination of unit graphic forms, said correction means corrects said shift amounts based on the movement of said unit graphic forms.

19. The drawing device as described in claim 12, wherein if said image is a three-dimensional image defined by a combination of unit graphic forms, the drawing device further comprises a sorting means for sorting said unit graphic forms into the order of a depth direction thereof, and said drawing means draws said unit graphic forms in order, beginning with unit graphic forms near the viewpoint.

20. The drawing device as described in claim 12, wherein said drawing means draws once based on a value obtained by dividing said pixel data by the overwriting number of times of said image with respect to said pixel data memory means.

21. The drawing device as described in claim 20, wherein if said pixel data or overwriting number of times is denoted by M or N, respectively, and the greatest integer less than or equal to x/y is denoted by INT[x/y], for one drawing, said drawing means writes into said pixel data memory means a value obtained by adding a prescribed correction value to the value denoted by INT[M/N].

22. The drawing device as described in claim 21, wherein if the value denoted by INT[M/N]×N is less than M, said correction value is a value such that N times the value obtained by adding the correction value to INT[M/N] is greater than or equal to M.

23. The drawing device as described in claim 1, wherein if said image is a three-dimensional image defined by a combination of unit graphic forms, the drawing device further comprises:

a conversion means for converting, in accordance with the viewpoint, said unit graphic forms which constitute said three-dimensional image to unit graphic forms in the coordinate system of said two-dimensional output device, a sorting means for sorting said unit graphic forms converted by said conversion means into the order of a depth direction thereof; and a depth memory means for recording values that represent the position of said unit graphic forms in the depth direction, and wherein using said depth memory means, said drawing means draws said unit graphic forms in order, beginning with unit graphic forms near the viewpoint.

24. The drawing device as described in claim 23, wherein if said pixel data is required in subpixel units, said shift amount setting means sets multiple shift amounts for shifting said drawing position of said pixel data with subpixel precision.

25. The drawing device as described in claim 23, wherein said drawing means further includes a count determination means for determining the number of overwriting times to overwrite said image.

26. The drawing device as described in claim 25, wherein said drawing means further includes an estimation means for estimating the drawing time needed for drawing one screenful of said pixel data to said pixel data memory means, and said count determination means determines said number of overwriting times based on said drawing time estimated by said estimation means.

27. The drawing device as described in claim 25, wherein if said pixel data is required in subpixel units, said count determination means determines said number of overwriting times based on the number of subpixels which constitute one pixel.

28. The drawing device as described in claim 23, wherein if said image is a moving image, the drawing device further comprises a correction means for correcting said shift amounts based on the movement of said moving image.

29. The drawing device as described in claim 28, wherein said correction means corrects said shift amounts based on the movement of said unit graphic forms.

30. The drawing device as described in claim 23, wherein said drawing means draws once based on a value obtained by dividing said pixel data by the overwriting number of times of said image with respect to said pixel data memory means.

31. The drawing device as described in claim 30, wherein if said pixel data or overwriting number of times is denoted by M or N, respectively, and the greatest integer less than or equal to x/y is denoted by INT[x/y], for one drawing, said drawing means writes into said pixel data memory means a value obtained by adding a prescribed correction value to the value denoted by INT[M/N].

32. The drawing device as described in claim 31, wherein if the value denoted by INT[M/N]×N is less than M, said correction value is a value such that N times the value obtained by adding the correction value to INT[M/N] is greater than or equal to M.

33. The drawing device as described in claim 1, wherein if said image is a three-dimensional image defined by a combination of unit graphic forms, the drawing device further comprises:

an operation means which is operated when a prescribed input is given thereto;

an arithmetic operation means for reading in data recorded in a storage medium and performing prescribed arithmetic operations using said recorded data, based on input from said operation means;

a conversion means for converting said unit graphic forms obtained as a result of calculation by said arithmetic operation means to unit graphic forms in the coordinate system of said two-dimensional output device:

a sorting means for sorting said unit graphic forms converted by said conversion means into the order of depth direction thereof; and a depth memory means for recording values which represent the position of said unit graphic forms in the depth direction, and wherein using said depth memory means, said drawing means draws said unit graphic forms in order, beginning with unit graphic forms near the viewpoint.

34. The drawing device as described in claim 33, wherein if said pixel data is required in subpixel units,
said shift amount setting means sets multiple shift amounts for shifting said drawing position of said pixel data with subpixel precision.

35. The drawing device as described in claim 33, wherein said drawing means further includes a count determination means for determining the number of overwriting times to overwrite said image.

36. The drawing device as described in claim 35, wherein said drawing means further includes an estimation means for estimating a drawing time needed for drawing one screenful of said pixel data to said pixel data memory means, and
said count determination means determines said number of overwriting times based on said drawing time estimated by said estimation means.

37. The drawing device as described in claim 35, wherein if said pixel data is required in subpixel units,
said count determination means determines said number of overwriting times based on the number of subpixels that constitute one pixel.

38. The drawing device as described in claim 33, wherein if said image is a moving image,
the drawing device further comprises a correction means for correcting said shift amounts based on the movement of said moving image.

39. The drawing device as described in claim 38 that is characterized in that
said correction means corrects said shift amounts based on the movement of said unit graphic forms.

40. The drawing device as described in claim 33, wherein said drawing means draws once based on a value obtained by dividing said pixel data by the overwriting number of times of said image with respect to said pixel data memory means.

41. The drawing device as described in claim 40, wherein if said pixel data or overwriting number of times is denoted by M or N, respectively, and the greatest integer less than or equal to x/y is denoted by INT[x/y],
for one drawing, said drawing means writes into said pixel data memory means a value obtained by adding a prescribed correction value to the value denoted by INT[M/N].

42. The drawing device as described in claim 41, wherein if the value denoted by INT[M/N]×N is less than M,
said correction value is a value such that N times the value obtained by adding the correction value to INT[M/N] is greater than or equal to M.

43. A drawing method in a drawing device for drawing images and including drawing means having a pixel data memory means that stores pixel data to be output to a two-dimensional output device that outputs said image, the drawing method comprising:
a shift amount setting step of setting multiple shift amounts for shifting, with a precision finer than one pixel, a drawing position when said pixel data is to be drawn in said pixel data memory means, and
a drawing step of overwriting said image by drawing said pixel data to each position of said pixel data memory means corresponding to the multiple shift amounts.

44. The drawing method as described in claim 43, wherein if said pixel data is required in subpixel units,
in said shift amount setting step, multiple shift amounts are set for shifting said drawing position of said pixel data with subpixel precision.

45. The drawing method as described in claim 43, wherein said drawing step further includes a count determination step of determining the number of overwriting times to overwrite said image.

46. The drawing method as described in claim 45, wherein said drawing step further includes an estimation step of estimating a drawing time needed for drawing one screenful of said pixel data to said pixel data memory means, and wherein
in said count determination step, said number of overwriting times is determined based on said drawing time estimated in said estimation step.

47. The drawing method as described in claim 45, wherein if said pixel data is required in subpixel units,
in said count determination step, said number of overwriting times is determined based on the number of subpixels that constitute one pixel.

48. The drawing method as described in claim 43, wherein if said image is a moving image,
the drawing method further comprises a correction step of correcting said shift amounts based on the movement of said moving image.

49. The drawing method as described in claim 48, wherein if said image is defined by a combination of unit graphic forms,
in said correction step, said shift amounts are corrected based on the movement of said unit graphic forms.

50. The drawing method as described in claim 43, wherein if said image is a three-dimensional image defined by a combination of unit graphic forms,
the drawing method further comprises a sorting step of sorting said unit graphic forms into the order of depth direction thereof, and
in said drawing step, said unit graphic forms are drawn in order, beginning with unit graphic forms near the viewpoint.

51. The drawing method as described in claim 43, wherein in said drawing step, drawing is done once based on a value obtained by dividing said pixel data by the overwriting number of times of said image with respect to said pixel data memory means.

52. The drawing method as described in claim 51, wherein if said pixel data or overwriting number of times is denoted by M or N, respectively, and the greatest integer less than or equal to x/y is denoted by INT[x/y],
in said drawing step, for one drawing, a value obtained by adding a prescribed correction value to the value denoted by INT[M/N] is written into said pixel data memory means.

53. The drawing method as described in claim 52, wherein if the value denoted by INT[M/N]×N is less than M, said correction value is a value such that N times the value obtained by adding the correction value to INT[M/N] is greater than or equal to M.

54. The drawing method as described in claim 43, wherein said drawing means is provided with an operation means which is operated when a prescribed input is given thereto, and the method further comprises:
an arithmetic operation step of reading in data recorded in a storage medium and performing prescribed arithmetic operations using said recorded data, based on input from said operation means, and a pixel data generation step of determining said pixel data based on the results of the arithmetic operation in said arithmetic operation step.

55. The drawing method as described in claim 54, wherein if said pixel data is determined in subpixel units, in said shift amount setting step, multiple shift amounts are set for shifting said drawing position of said pixel data with subpixel precision.

56. The drawing method as described in claim 54, wherein said drawing step further includes a count determination step of determining a number of overwriting times to overwrite said image.

57. The drawing method as described in claim 56, wherein said drawing step further includes an estimation step of estimating the drawing time needed for drawing one screenful of said pixel data to said pixel data memory means, and wherein in said count determination step, said number of overwriting times is determined based on said drawing time estimated in said estimation step.

58. The drawing method as described in claim 56, wherein if said pixel data is required in subpixel units, in said count determination step, said number of overwriting times is determined based on the number of subpixels that constitute one pixel.

59. The drawing method as described in claim 54, wherein if said image is a moving image, the drawing method further comprises a correction step of correcting said shift amounts based on the movement of said moving image.

60. The drawing method as described in claim 59, wherein if said image is defined by a combination of unit graphic forms, in said correction step, said shift amounts are corrected based on the movement of said unit graphic forms.

61. The drawing method as described in claim 54, wherein if said image is a three-dimensional image defined by a combination of unit graphic forms, the drawing method further comprises a sorting step of sorting said unit graphic forms into the order of depth direction thereof, and in said drawing step, said unit graphic forms are drawn in order, beginning with unit graphic forms near the viewpoint.

62. The drawing method as described in claim 54, wherein in said drawing step, drawing is done once based on a value obtained by dividing said pixel data by the overwriting number of times of said image with respect to said pixel data memory means.

63. The drawing method as described in claim 62, wherein if said pixel data or overwriting number of times is denoted by M or N, respectively, and the greatest integer less than or equal to x/y is denoted by INT[x/y], for one drawing, said drawing step writes into said pixel data memory means a value obtained by adding a prescribed correction value to the value denoted by INT[M/N].

64. The drawing method as described in claim 63, wherein if the value denoted by INT[M/N]×N is less than M, said correction value is a value such that N times a value obtained by adding the correction value to INT[M/N] is greater than or equal to M.

65. The drawing method as described in claim 43, wherein if said image is a three-dimensional image defined by a combination of unit graphic forms, said drawing means is provided with a depth memory means for recording values that represent the position of said unit graphic forms in the depth direction thereof, and the method further comprises a conversion step of converting, in accordance with the viewpoint, said unit graphic forms that constitute said three-dimensional image to unit graphic forms in the coordinate system of said two-dimensional output device, and wherein in said drawing step, using said depth memory means, said unit graphic forms are drawn in order, beginning with unit graphic forms near the viewpoint.

66. The drawing method as described in claim 65, wherein if said pixel data is required in subpixel units, in said shift amount setting step, multiple shift amounts are set for shifting said drawing position of said pixel data with subpixel precision.

67. The drawing method as described in claim 65, wherein said drawing step further includes a count determination step of determining the number of overwriting times to overwrite said image.

68. The drawing method as described in claim 67, wherein said drawing step further includes an estimation step of estimating a drawing time needed for drawing one screenful of said pixel data to said pixel data memory means, and in said count determination step, said number of overwriting times is determined based on said drawing time estimated in said estimation step.

69. The drawing method as described in claim 67, wherein if said pixel data is required in subpixel units, in said count determination step, said number of overwriting times is determined based on the number of subpixels that constitute one pixel.

70. The drawing method as described in claim 65, wherein if said image is a moving image, the drawing method further comprises a correction step of correcting said shift amounts based on the movement of said moving image.

71. The drawing method as described in claim 70, wherein in said correction step, said shift amounts are corrected based on the movement of said unit graphic forms.

72. The drawing method as described in claim 65, wherein in said drawing step, drawing is done once based on a value obtained by dividing said pixel data by the overwriting number of times of said image with respect to said pixel data memory means.

73. The drawing method as described in claim 72, wherein if said pixel data or overwriting number of times is denoted by M or N, respectively, and the greatest integer less than or equal to x/y is denoted by INT[x/y], in said drawing step, a value obtained by adding a prescribed correction value to the value denoted by INT[M/N] is drawn for one drawing.

74. The drawing method as described in claim 73, wherein if the value denoted by INT[M/N]×N is less than M, said correction value is a value such that N times the value obtained by adding the correction value to INT[M/N] is greater than or equal to M.

75. A distribution medium for providing a computer program to a computer to cause the computer it to do the processing for drawing images, wherein a computer program is provided that includes:

a shift amount setting step that sets multiple shift amounts for shifting, with a precision finer than one pixel, the drawing position when said pixel data to be output to a two-dimensional output device that outputs said image is to be drawn to memory, and a drawing step that overwrites said image by drawing said pixel data to each position of said memory corresponding to the multiple shift amounts.

76. The distribution medium as described in claim 75, wherein if said pixel data is required in subpixel units, in said shift amount setting step, multiple shift amounts are set for shifting said drawing position of said pixel data with subpixel precision.

77. The distribution medium as described in claim 75, wherein said computer program further has in said drawing step a count determination step that determines the number of overwriting times to overwrite said image in said drawing step.

78. The distribution medium as described in claim 77, wherein said computer program further has in said drawing step an estimation step that estimates the drawing time needed for drawing one screenful of said pixel data to said memory, and in said count determination step, said number of overwriting times is determined based on said drawing time estimated in said estimation step.

79. The distribution medium as described in claim 77, wherein if said pixel data is required in subpixel units, in said count determination step, said number of overwriting times is determined based on the number of subpixels that constitute one pixel.

80. The distribution medium as described in claim 75, wherein if said image is a moving image, said computer program further has a correction step that corrects said shift amounts based on the movement of said moving image.

81. The distribution medium as described in claim 80, wherein if said image is defined by a combination of unit graphic forms, in said correction step, said shift amounts are corrected based on the movement of said unit graphic forms.

82. The distribution medium as described in claim 75, wherein if said image is a three-dimensional image defined by a combination of unit graphic forms, said computer program further has a sorting step that sorts said unit graphic forms into the order of their depth direction, and in said drawing step, said unit graphic forms are drawn in order, beginning with those near the viewpoint.

83. The distribution medium as described in claim 75, wherein in said drawing step, drawing is done once based on the value obtained by dividing said pixel data by the overwriting number of times of said image with respect to said memory.

84. The distribution medium as described in claim 83, wherein if said pixel data or overwriting number of times is denoted by M or N, respectively, and the greatest integer less than or equal to x/y is denoted by INT[x/y], in said drawing step, for one drawing, a value obtained by adding a prescribed correction value to the value denoted by INT[M/N] is drawn.

85. The distribution medium as described in claim 84, wherein if the value denoted by INT[M/N]×N is less than M, said correction value is a value such that N times the value obtained by adding the correction value to INT[M/N] is greater than or equal to M.

* * * * *